(12) United States Patent
Michaud et al.

(10) Patent No.: US 10,118,987 B2
(45) Date of Patent: Nov. 6, 2018

(54) HYDROCARBON-BASED POLYMERS BEARING DITHIOCYCLOCARBONATE END GROUPS

(71) Applicants: Bostik SA, La Plaine Saint Denis (FR); Universite De Rennes I, Rennes (FR); Centre National De La Recherche Scientifique, Paris (FR)

(72) Inventors: Guillaume Michaud, Compiegne (FR); Frederic Simon, Pont L'eveque (FR); Stephane Fouquay, Mont Saint-Aignan (FR); Elise Vanbiervliet, Rennes (FR); Sophie Guillaume, Vitre (FR); Jean-Francois Carpentier, Acigne (FR)

(73) Assignees: BOSTIK SA, La Plaine Saint Denis (FR); UNIVERSITE DE RENNES I, Rennes (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 0 days.

(21) Appl. No.: 15/677,153

(22) Filed: Aug. 15, 2017

(65) Prior Publication Data

US 2018/0051130 A1    Feb. 22, 2018

(30) Foreign Application Priority Data

Aug. 16, 2016 (FR) ...................... 16 57777

(51) Int. Cl.
*C08F 24/00* (2006.01)
*C07D 327/04* (2006.01)
(Continued)

(52) U.S. Cl.
CPC ................ *C08G 61/08* (2013.01); *C09J 5/00* (2013.01); *C09J 165/00* (2013.01);
(Continued)

(58) Field of Classification Search
CPC  C08G 61/08; C08G 2261/11; C08G 2261/12; C08G 2261/1646;
(Continued)

(56) References Cited

U.S. PATENT DOCUMENTS

| 5,391,773 A | 2/1995 | Puckette |
| 5,498,584 A | 3/1996 | Puckette |

(Continued)

FOREIGN PATENT DOCUMENTS

| EP | 1233030 A1 | 8/2002 |
| WO | 95/35290 A1 | 12/1995 |

(Continued)

OTHER PUBLICATIONS

Search Report dated Apr. 13, 2017 issued in corresponding FR 1657777 application (3 pages).
A. Yoshiwara, "Polymerizable Composition, (Crosslinkable) Resin Molding Therefrom, and (Crosslinked) Resin Composite Molding with Good Adhesion to Different Materials Therewith", Database Caplus [Online] (Sep. 19, 2013) XP-002745123.

*Primary Examiner* — William K Cheung
(74) *Attorney, Agent, or Firm* — Millen, White, Zelano & Branigan, P.C.

(57) ABSTRACT

1) Hydrocarbon-based polymer of formula (I):

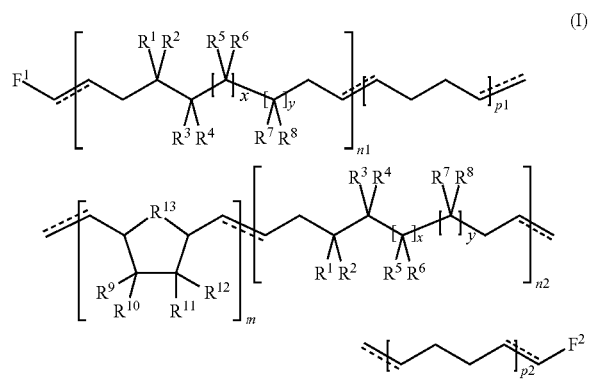

in which $F^1$ and $F^2$ have the respective formulae (IIa) and (IIb) or (II'a) and (II'b):

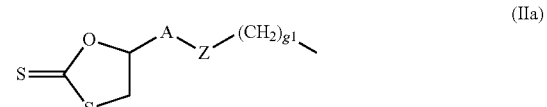

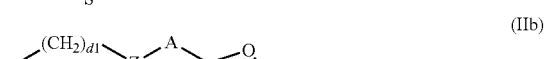

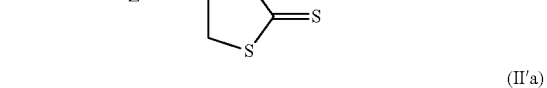

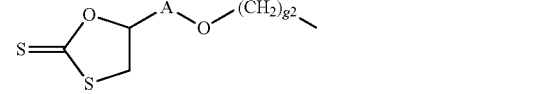

a process for its preparation, and use as an adhesive.

15 Claims, No Drawings

(51) Int. Cl.
  *C08G 61/08* (2006.01)
  *C09J 165/00* (2006.01)
  *C09J 5/00* (2006.01)

(52) U.S. Cl.
  CPC ...... *C08G 2261/11* (2013.01); *C08G 2261/12* (2013.01); *C08G 2261/1646* (2013.01); *C08G 2261/3323* (2013.01); *C08G 2261/3324* (2013.01)

(58) Field of Classification Search
  CPC ..... C08G 2261/3323; C08G 2261/3324; C09J 165/00; C09J 5/00
  USPC .......................................... 525/327.2; 549/30
  See application file for complete search history.

(56) References Cited

U.S. PATENT DOCUMENTS

| | | |
|---|---|---|
| 6,465,590 B1 | 10/2002 | Maughon et al. |
| 6,759,484 B1 * | 7/2004 | Murayama .............. C08F 20/38 524/114 |
| 9,359,459 B2 | 6/2016 | Michaud et al. |
| 2015/0315310 A1 | 11/2015 | Michaud et al. |

FOREIGN PATENT DOCUMENTS

| | | |
|---|---|---|
| WO | 2005/016908 A1 | 2/2005 |
| WO | 2013/137175 A1 | 9/2013 |
| WO | 2014/091173 A1 | 6/2014 |
| WO | 2016/062780 A1 | 4/2016 |

* cited by examiner

HYDROCARBON-BASED POLYMERS BEARING DITHIOCYCLOCARBONATE END GROUPS

The present invention relates to hydrocarbon-based polymers comprising two (2-thione-1,3-oxathiolan-4-yl) end groups (also referred to in the present patent application as hydrocarbon-based polymers bearing "dithiocyclocarbonate" end groups), to the process for preparing them and to their use in the manufacture of coating, mastic or adhesive compositions.

It is known practice to use polyurethanes to manufacture various coating, mastic or adhesive compositions.

These compositions may be in the form of one-pack or two-pack compositions. In the latter case, the reagents required for the synthesis of the polyurethane are stored separately, optionally in the presence of other ingredients (additives), and are intended to be mixed before use of the composition, to synthesize the polyurethane at the last moment.

Polyurethanes are conventionally synthesized by reaction of a diisocyanate with a diol.

However, diisocyanates are toxic compounds per se and are generally obtained from phosgene, which is itself very toxic by inhalation or by contact. The manufacturing process used industrially generally involves the reaction of an amine with an excess of phosgene to form an isocyanate.

Furthermore, polyisocyanates are compounds that are highly sensitive in the presence of atmospheric moisture and require that appropriate measures be taken to avoid their premature crosslinking, and thus their loss of reactivity, during their handling and storage (anhydrous conditions).

The search for alternatives to the synthesis of polyurethanes without using isocyanate (or NIPU for Non-Isocyanate PolyUrethane) thus represents a major challenge.

This search has formed the subject of numerous studies. The approaches most widely studied concern the use of polymers that are capable of reacting with amines or amine oligomers to form polyurethanes or derivatives that are structurally close to polyurethanes, such as poly(thio)urethanes, which will be generically denoted in the present patent application by the term "polymers of polyurethane type".

Patent application WO 2014/091173, in the name of Bostik and the CNRS, describes hydrocarbon-based polymers comprising two end groups bearing a (2-oxo-1,3-dioxolan-4-yl) end group which may be obtained by ring-opening metathesis polymerization starting from at least one cyclic cycloolefin, at least one non-cyclic unsaturated chain-transfer agent comprising a (2-oxo-1,3-dioxolan-4-yl) end group, and at least one metathesis catalyst.

These polymers can subsequently react with a (poly)amine to form non-isocyanate polyurethanes bearing hydroxyl functions, which may be used to formulate coating, mastic or adhesive compositions. However, this reaction is relatively slow and remains to be improved.

Patent application WO 2005/016908 from Henkel describes the synthesis of 5-membered hydroxylated dithiocyclocarbonate (DTC-OH):

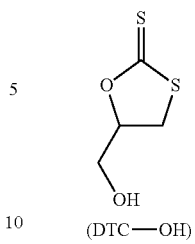

(DTC—OH)

and the various uses thereof for forming, inter alia, (thio)urethane synthons bearing thiol and hydroxyl groups, intended for the manufacture of adhesives, surface coatings or mastics:

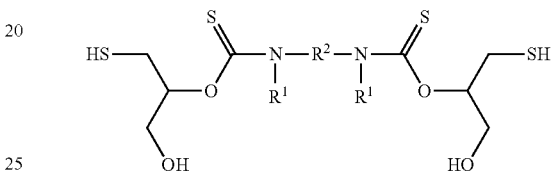

These synthons are obtained without using isocyanate, by reaction of (DTC-OH) with a diamine. They may then be crosslinked with each other in the presence of dioxygen and of a crosslinking catalyst to reach molar masses of greater than 500 g/mol. The poly(thio)urethanes obtained differ from those of the present invention.

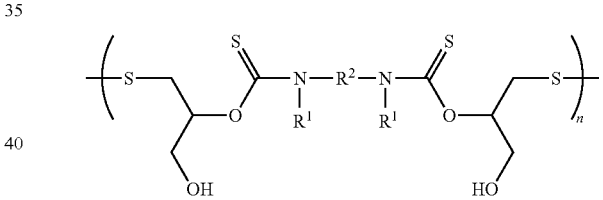

Patent application WO 2005/016908 also discloses the use of (DTC-OH) for preparing standard polyurethanes bearing (2-thione-1,3-oxathiolan-4-yl)methyloxycarbonyl (DTC-polyurethane) end groups and having low molar masses (less than 2700 g/mol), but their manufacture involves isocyanates.

The aim of the present invention is to provide novel intermediates for synthesizing polymers of polyurethane type, intended for the manufacture of coating, mastic or adhesive compositions, and which overcome all or some of the drawbacks of the prior art.

In particular, the aim of the present invention is to provide novel intermediates whose synthesis does not involve isocyanates and which are capable of reacting more rapidly with a (poly)amine, relative to the hydrocarbon-based polymers bearing (2-oxo-1,3-dioxolan-4-yl) end groups of patent application WO 2014/091173.

Thus, the present invention relates to a hydrocarbon-based polymer comprising two dithiocyclocarbonate end groups, said hydrocarbon-based polymer having the formula (I):

(I)

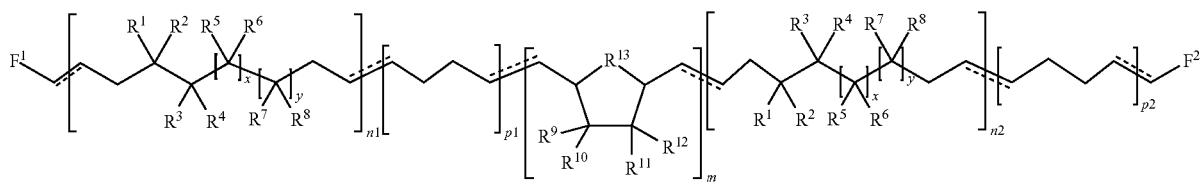

in which:

F¹ and F² are monovalent radicals of respective formulae (IIa) and (IIb):

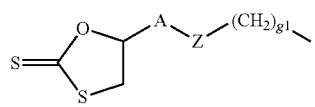  (IIa)

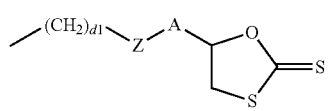  (IIb)

or alternatively F¹ and F² are monovalent radicals of respective formulae (II'a) and (II'b):

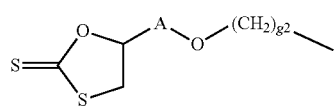  (II'a)

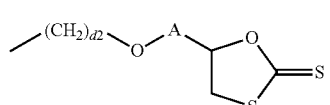  (II'b)

in which:
- g1 and d1, which may be identical or different, represent an integer equal to 0, 1, 2 or 3;
- g2 and d2, which may be identical or different, represent an integer equal to 1, 2 or 3;
- A represents a divalent $C_1$-$C_9$ alkylene radical;
- Z is such that:
  - the divalent group -A-Z— is the group -A-C(=O)O— and the divalent group —Z-A- is the group —OC(=O)-A- with the proviso that g1 and d1 are each other than 0; or alternatively
  - the divalent group -A-Z— is the group -A-OC(=O)— and the divalent group —Z-A- is the group C(=O)O-A-;

each carbon-carbon bond of the main chain of the polymer, denoted ———, represents a double bond or a single bond, in accordance with the valency rules of organic chemistry;

$R^1$, $R^2$, $R^3$, $R^4$, $R^5$, $R^6$, $R^7$ and $R^8$, which may be identical or different, represent:
- a hydrogen or halogen atom; or
- a radical comprising from 1 to 22 carbon atoms chosen from alkyl, alkenyl, alkoxycarbonyl, alkenyloxycarbonyl, alkylcarbonyloxy or alkenylcarbonyloxy, it being possible for the hydrocarbon-based chain of said radical to be optionally interrupted with at least one oxygen atom or one sulfur atom; in addition:
- at least one of the $R^1$ to $R^8$ groups can form, with at least one other of the $R^1$ to $R^8$ groups and with the carbon atom or atoms to which said groups are linked, a 3- to 10-membered, optionally substituted, saturated or unsaturated hydrocarbon-based ring or heterocycle; and
- at least one of the pairs ($R^1$, $R^2$), ($R^3$, $R^4$), ($R^5$, $R^6$) and ($R^7$, $R^8$) can form, with the carbon atom to which said pair is linked, a carbonyl group C=O or a group of two carbon atoms linked by a double bond: C=C, the other carbon atom of which bears two substituents chosen from a hydrogen atom and a $C_1$-$C_4$ alkyl radical;

x and y are integers, which may be identical or different, within a range extending from 0 to 4, the sum x+y being within a range extending from 0 to 4;

$R^9$, $R^{10}$, $R^{11}$ and $R^{12}$, which may be identical or different, represent:
- a hydrogen or halogen atom; or
- a radical comprising from 1 to 22 carbon atoms which is chosen from alkyl, alkenyl, alkoxycarbonyl, alkenyloxycarbonyl, alkylcarbonyloxy, alkenylcarbonyloxy and alkylcarbonyloxyalkyl, it being possible for the hydrocarbon-based chain of said radical to be optionally interrupted with at least one oxygen atom or one sulfur atom; in addition:
- at least one of the $R^9$ to $R^{12}$ groups can form, with at least one other of the $R^9$ to $R^{12}$ groups and with the carbon atom or atoms to which said groups are linked, a 3- to 10-membered, optionally substituted, saturated or unsaturated hydrocarbon-based ring or heterocycle; and
- at least one of the pairs ($R^9$, $R^{10}$) and ($R^{11}$, $R^{12}$) can form, with the carbon atom to which said pair is linked, a group of two carbon atoms linked by a double bond: C=C, the other carbon atom of which bears two substituents chosen from a hydrogen atom and a $C_1$-$C_4$ alkyl radical; and
- the carbon atom bearing one of the groups of the pair ($R^9$, $R^{10}$) may be linked to the carbon atom bearing one of the groups of the pair ($R^{11}$, $R^{12}$) by a double bond, it being understood that, in accordance with the valency rules, only one of the groups of each of these two pairs is then present;

$R^{13}$ represents:
- an oxygen or sulfur atom, or
- a divalent radical —$CH_2$—, —C(=O)— or —$NR^0$— in which $R^0$ is an alkyl or alkenyl radical comprising from 1 to 22 carbon atoms;

n1 and n2, which may be identical or different, are each an integer or equal to 0, the sum of which is denoted by n;

m is an integer greater than or equal to 0;

p1 and p2, which may be identical or different, are each an integer or equal to 0, the sum p1+p2 of which is non-zero and adheres to the equation:

$$p1+p2=q\times(z+1)$$

in which:
q is an integer greater than 0; and
z is an integer ranging from 1 to 5; and
n1, n2, m, p1 and p2 also being such that the number-average molecular mass Mn of the polymer of formula (I) is within a range extending from 400 to 100 000 g/mol and its polydispersity index is within a range extending from 1.0 to 3.0.

The various groups, radicals and letters which are included in formula (I) and which are defined above retain the same definitions throughout the present text, unless otherwise indicated.

The following variants of the polymer of formula (I), taken individually or in combination, are particularly preferred:
  $R^1$, $R^2$, $R^3$, $R^4$, $R^5$, $R^6$, $R^7$ and $R^8$ represent a hydrogen atom or an alkyl radical comprising from 1 to 14 and even more preferentially from 1 to 8 carbon atoms;
  the integers x and y are within a range extending from 0 to 2, the sum x+y being within a range extending from 0 to 2;
  x is equal to 1 and y is equal to 1;
  $R^9$, $R^{10}$, $R^{11}$ and $R^{12}$ represent a hydrogen atom or a radical, the hydrocarbon-based part of which comprises from 1 to 14 and even more preferentially from 1 to 8 carbon atoms;
  z is an integer equal to 1 or 2; and/or
  the number-average molecular mass Mn is within a range extending from 1000 to 50 000 g/mol and the polydispersity index is within a range extending from 1.4 to 2.0.

According to other more particularly preferred variants of the polymer of formula (I):
  at most one of the groups taken from ($R^1$, $R^2$, $R^3$, $R^4$, $R^5$, $R^6$, $R^7$ and $R^8$) is a $C_1$-$C_8$ alkyl radical and all the others represent a hydrogen atom;
  at most one of the groups taken from ($R^9$, $R^{10}$, $R^{11}$ and $R^{12}$) is a $C_1$-$C_8$ alkoxycarbonyl radical and all the others represent a hydrogen atom; and/or
  $R^{13}$ represents a —$CH_2$— radical or an oxygen atom.

The main chain of the polymer of formula (I) thus comprises one, two or three repeating units:
  a first repeating unit repeated p1+p2 times,
  a second, optional, repeating unit repeated n1+n2 times, and
  a third, optional, repeating unit repeated m times.

It is understood that when said main chain comprises at least two repeating units, the distribution of said units on said main chain is random, and that the polymer of formula (I) is thus a random polymer.

As is seen above, the end groups $F^1$ and $F^2$ are generally symmetrical relative to the main chain, i.e., they correspond substantially, with the exception of the indices g1 and g2, and d1 and d2.

The term "heterocycle" means a hydrocarbon-based ring which may comprise an atom other than carbon in the chain of the ring, for instance oxygen, sulfur or nitrogen atoms.

The term "end group" means a group located at one of the two extremities of the main chain of the polymer, which chain consists of one or more repeating units.

The polydispersity index (also known as the PDI) is defined as the ratio Mw/Mn, i.e., the ratio of the weight-average molecular mass to the number-average molecular mass of the polymer.

In the present text, the two average molecular masses Mn and Mw are measured by size exclusion chromatography (or SEC), which is also denoted by the term "gel permeation chromatography" (or GPC). The calibration performed is usually a PEG (PolyEthylene Glycol) or PS (PolyStyrene), preferably PS, calibration.

If g1=0 or d1=0, then there is no —($CH_2$)— radical in the radicals of formula (IIa) or (IIb). In other words, the radical: —$(CH_2)_{g1}$— or —$(CH_2)_{d1}$— is replaced with a single bond.

When one of the indices n1, n2, m, x or y which applies to a set of two square brackets is equal to zero, this means that there is no group between the square brackets to which this index applies. Thus, for example, the group:

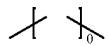

represents a single bond: ———, and the group:

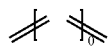

represents a double bond: ═══.

The polymers of formula (I) according to the invention are particularly homogeneous and temperature-stable.

They may form, after a polyaddition reaction at a temperature below 100° C., or even at room temperature, with at least one amine compound comprising at least two amine groups, such as a primary and/or secondary polyamine, a constituent poly(thio)urethane of an adhesive seal.

The adhesive seal thus formed has high cohesive values, in particular of greater than 1.5 MPa. Such cohesive values allow said polymer to be used as adhesive, for example as leaktightness seal on an ordinary support (concrete, glass, marble), in the building industry, or alternatively for the bonding of glazings in the motor vehicle and shipbuilding industries.

The polymers of formula (I) according to the invention may be, at room temperature (i.e., about 20° C.), solids, viscous liquids or very fluid liquids.

When the polymer according to the invention is solid at room temperature, it is thermoplastic, i.e., deformable and meltable under hot conditions (i.e., at a temperature above room temperature). It may thus be used, in combination, for example, with a diamine, as a two-pack hot-melt adhesive and applied under hot conditions to the interface of substrates to be assembled at their contact surface. By solidifying at room temperature, an adhesive seal rendering the substrates integral and consisting of a poly(thio)urethane is thus rapidly created, then giving the adhesive advantageous properties of reduced curing time.

According to a first alternative of a preferred variant of the polymer according to the invention, when m is non-zero and when n1 and n2 are each equal to 0 (corresponding to the presence in the main chain of the polymer of the two lone repeating units repeated, respectively, p1+p2 times and m times), then the ratio:

$$m/(p1+p2+m)$$

is within the interval ranging from 30 to 70% and more preferably is equal to about 50%.

According to a second alternative of this same preferred variant, when m is equal to 0 and when the sum n1+n2 is non-zero (corresponding to the presence in the main chain of the polymer of the two lone repeating units repeated respectively p1+p2 times and n1+n2 times), then at least one of the groups $R^1$, $R^2$, $R^3$, $R^4$, $R^5$, $R^6$, $R^7$ and $R^8$ is other than a hydrogen atom, and the ratio:

$(n1+n2)/(p1+p2+n1+n2)$ is within the interval ranging from 30 to 70% and more preferably is equal to approximately 50%.

According to a third alternative of said preferred variant, when m is non-zero, when the sum n1+n2 is non-zero (corresponding to the presence in the main chain of the polymer of the three repeating units) and when each of the groups $R^1$, $R^2$, $R^3$, $R^4$, $R^5$, $R^6$, $R^7$ and $R^8$ is a hydrogen atom, then the ratio:

$m/(p1+p2+n1+n2+m)$ is within the interval ranging from 30 to 70% and more preferably is equal to approximately 50%.

According to a fourth alternative of said preferred variant, when m is non-zero, when the sum n1+n2 is non-zero (corresponding to the presence in the main chain of the polymer of the three repeating units) and when at least one of the groups $R^1$, $R^2$, $R^3$, $R^4$, $R^5$, $R^6$, $R^7$ and $R^8$ is other than a hydrogen atom, then the ratio:

$(m+n1+n2)/(p1+p2+n1+n2+m)$ is within the interval ranging from 30 to 70% and more preferably is equal to approximately 50%.

In accordance with the four alternatives of said preferred variant, the polymer of formula (I) is generally in the form of a viscous liquid generally having a Brookfield viscosity at 23° C. of between 1 mPa·s and 500 Pa·s, preferably between 1 to 150 Pa·s and even more preferentially from 1 to 50 Pa·s. It is then advantageously easy to implement and can be combined with an additional constituent, such as a tackifying resin or a filler, in order to form an adhesive composition.

In general, the viscosity may be measured in a manner well known to those skilled in the art. In particular, the viscosity may be measured with a Brookfield viscometer, choosing the needle and the spindle speed appropriately as a function of the viscosity range to be measured.

According to one embodiment of the invention, all the ====== bonds of formula (I) are carbon-carbon double bonds and formula (I) then becomes formula (I') below:

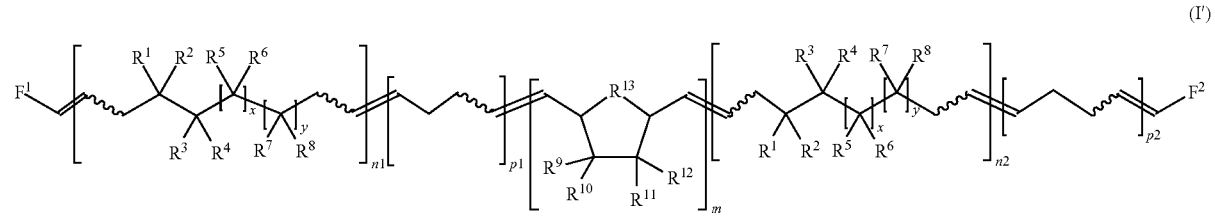

(I')

in which x, y, n1, n2, m, $F^1$, $F^2$, $R^1$, $R^2$, $R^3$, $R^4$, $R^5$, $R^6$, $R^7$, $R^8$, $R^9$, $R^{10}$, $R^{11}$, $R^{12}$ and $R^{13}$ have the meanings given above and the 〰 bond is a bond geometrically oriented on one side or the other relative to the double bond (cis or trans).

Each of the double bonds of the polymer of formula (I') is geometrically cis or trans oriented, and preferably is of cis orientation. The geometric isomers of the polymer of formula (I') are generally present in variable proportions, usually with a majority of double bonds oriented cis (Z) and preferentially all oriented cis (Z). It is also possible according to the invention to obtain just one of the geometric isomers, according to the reaction conditions and in particular according to the nature of the catalyst used.

According to another embodiment of the invention, all the ====== bonds of formula (I) are carbon-carbon single bonds and formula (I) then becomes formula (IH) below:

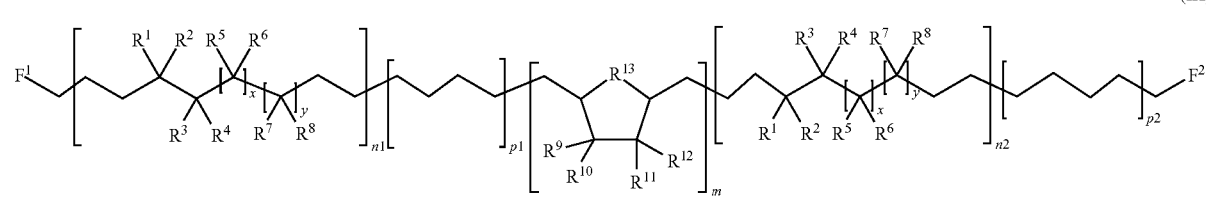

(IH)

in which x, y, n1, n2, m, p1, p2, $F^1$, $F^2$, $R^1$, $R^2$, $R^3$, $R^4$, $R^5$, $R^6$, $R^7$, $R^8$, $R^9$, $R^{10}$, $R^{11}$, $R^{12}$ and $R^{13}$ have the meanings given above.

Formula (IH) illustrates the case where the main chain of the polymer of formula (I) is saturated, i.e., it comprises only saturated bonds.

In this case, preferably, x is equal to 1 and y is equal to 1.

According to one embodiment of the polymer of formula (I) according to the invention, m is equal to 0, the polymer being of formula (II) below:

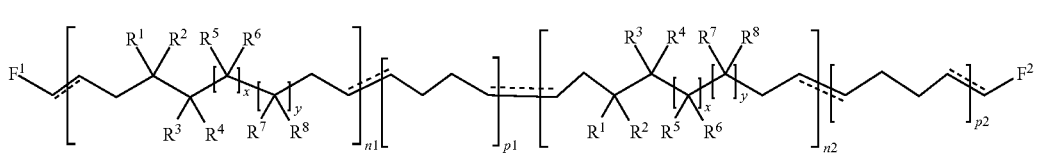
(II)

in which x, y, n1, n2, $F^1$, $F^2$, $R^1$, $R^2$, $R^3$, $R^4$, $R^5$, $R^6$, $R^7$ and $R^8$ have the meanings given above.

Particularly preferably, x is equal to 1 and y is equal to 1.

According to a particularly preferred form of this embodiment, all the ====== bonds of formula (II) are carbon-carbon double bonds and the formula (II) then becomes formula (II') below:

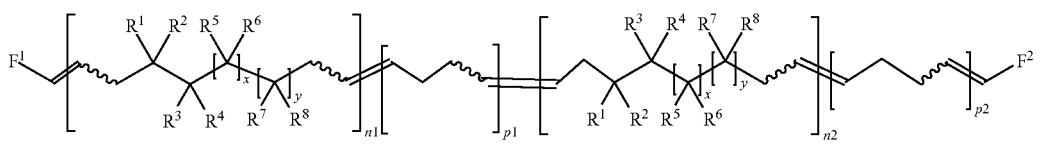
(II')

Formulae (II) and (II') illustrate the case where the main chain of the polymer of formula (1) comprises only two repeating units, respectively repeated n1+n2 and p1+p2 times.

According to another embodiment of the polymer of formula (I) according to the invention, n1 and n2 are each equal to 0, the polymer being of formula (III) below:

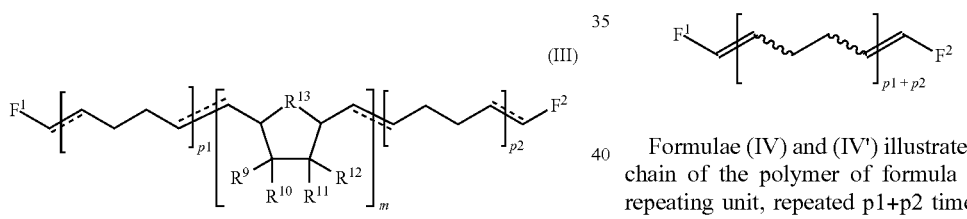
(III)

in which m, p1, p2, $F^1$, $F^2$, $R^9$, $R^{10}$, $R^{11}$, $R^{12}$ and $R^{13}$ have the meanings given above.

According to a particularly preferred form of this embodiment, all the ====== bonds of formula (III) are carbon-carbon double bonds and formula (III) then becomes formula (III') below:

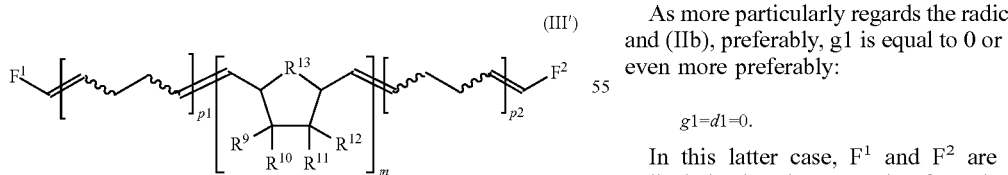
(III')

Formulae (III) and (III') illustrate cases where the main chain of the polymer of formula (I) only comprises two repeating units, respectively repeated (p1+p2) times and m times.

According to yet another embodiment of the polymer of formula (I) according to the invention, n1, n2 and m are each equal to 0, the polymer being of formula (IV) below:

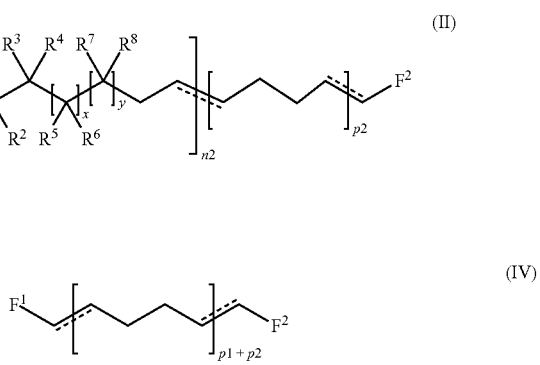
(IV)

in which p1, p2, $F^1$, $F^2$ have the meanings given previously.

According to a particularly preferred form of this embodiment, all the ====== bonds of formula (IV) are carbon-carbon double bonds and formula (IV) then becomes formula (IV') below:

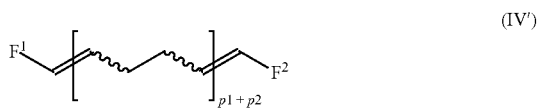
(IV')

Formulae (IV) and (IV') illustrate the case where the main chain of the polymer of formula (I) comprises only one repeating unit, repeated p1+p2 times.

As regards the dithiocyclocarbonate end groups of the polymer according to the invention, preferably:
- the radical A, which is included in the definition of the radicals of formulae (IIa), (IIb), (II'a) and (II''b), represents a methylene radical; and/or
- Z, which is included in the definition of the radicals of formulae (IIa) and (IIb), is such that the divalent group -A-Z— is the group -A-OC(=O)— and the divalent group —Z-A- is the group —C(=O)O-A-.

As more particularly regards the radicals of formulae (IIa) and (IIb), preferably, g1 is equal to 0 or d1 is equal to 0, and even more preferably:

$g1=d1=0$.

In this latter case, $F^1$ and $F^2$ are advantageously the radicals having the respective formulae:

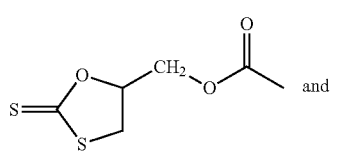
and

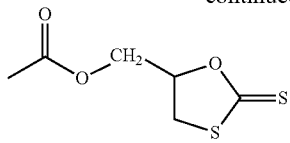

As more particularly regards the radicals of formulae (II'a) and (II'b), preferably, g2 is equal to 1 or d2 is equal to 1, and even more preferably:

$g2=d2=1$.

In this latter case, $F^1$ and $F^2$ are advantageously the radicals having the respective formulae:

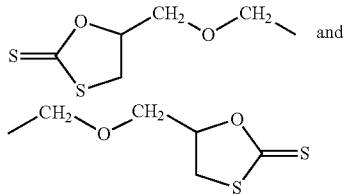

The invention also relates to a process for preparing a hydrocarbon-based polymer comprising two dithiocyclocarbonate end groups of formula (I) according to the invention, said process comprising at least:

(i) a step of ring-opening metathesis polymerization (also known as ROMP), in the presence of:
(a) a metathesis catalyst;
(b) a chain-transfer agent (also denoted below by CTA) which is:
when $F^1$ and $F^2$ are the monovalent radicals having the respective formulae (IIa) and (IIb): a mono- or diepoxide compound having the respective formulae (E1) and (E2):

 (E1)

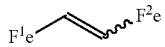 (E2)

in which $F^1e$ and $F^2e$ are the monovalent radicals having the respective formulae (IIea) and (IIeb):

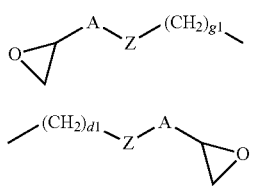

and
when $F^1$ and $F^2$ are the monovalent radicals having the respective formulae (II'a) and (II'b): a diepoxide compound of formula (E'2):

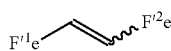 (E'2)

in which $F'^1e$ and $F'^2e$ are the monovalent radicals having the respective formulae (II'ea) and (II'eb):

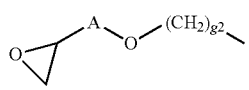 (II'ea)

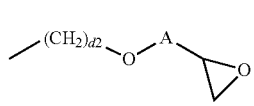 (II'eb)

it being understood that, in the above formulae:
the ～ bond is a carbon-carbon single bond geometrically oriented on one side or the other relative to the double bond (cis or trans);
A, Z, g1, d1, g2 and d2 are as defined previously;
(c) a compound of formula (C):

 (C)

in which z is as defined previously; and
(d) optionally a compound of formula (D):

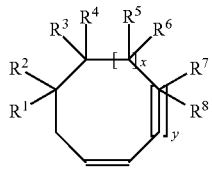 (D)

in which $R^1$, $R^2$, $R^3$, $R^4$, $R^5$, $R^6$, $R^7$, $R^8$, x and y are as defined above; and
(e) optionally a compound of formula (E):

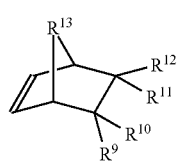 (E)

in which $R^9$, $R^{10}$, $R^{11}$, $R^{12}$ and $R^{13}$ are as defined above;
said polymerization step leading to the formation of a polymer bearing epoxide end groups of formula (V):

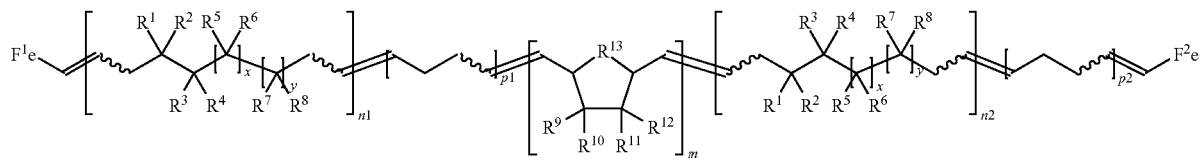

or (V'):

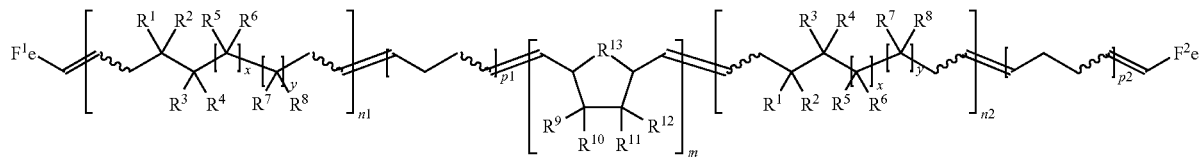

in which F¹e, F²e, F'¹e and F'²e are as defined previously, and, in the case where the CTA of formula (E1) is implemented: F¹e=F²e;

said polymerization step also being performed:
for a time ranging from 2 to 24 hours and at a temperature within an interval from 20 to 60° C.; and
with a ratio r equal to the ratio of the number of moles of said CTA:
to the number of moles of the compound of formula (C), if the latter is the only reagent other than the CTA implemented in the reaction, or
to the sum of the number of moles of the compound of formula (C) and of the number of moles of the compounds of formulae (D) and/or (E), if the compounds of formulae (D) and/or (E) are also implemented in the reaction,
within an interval ranging from 0.0010 to 1.0; and then (ii) a step of dithiocarbonation of the polymer of formula (V) or (V') obtained in the preceding step, by reaction with carbon disulfide ($CS_2$) in the presence of a halogenated lithium compound, such as lithium bromide, at a temperature ranging from 10 to 45° C., until the hydrocarbon-based polymer comprising two dithiocyclocarbonate end groups according to the invention is obtained.

When the hydrocarbon-based polymer comprising two dithiocyclocarbonate end groups according to the invention bears a saturated main chain, as envisaged by formula (1H) defined previously, the above preparation process comprises, between steps (i) and (ii), a step of selective hydrogenation of the double bonds of the polymer derived from step (i) bearing two epoxy end groups of formula (V) or (V'). This selective hydrogenation may be performed according to the process described in patent application WO 9 535 290 from Eastman Chemical.

In the definition of the polymerization step given above, it is clearly understood that the indefinite article "a" or "an", as it relates to a reagent or to the catalyst implemented or else to the product formed, should be interpreted as meaning "at least one", i.e., "one or more".

The duration and the temperature of the reaction depend generally on its operating conditions, especially on the nature of the solvent used and in particular on the content of catalytic filler. A person skilled in the art is capable of adjusting them as a function of the circumstances.

Thus, preferably, the duration of the polymerization reaction ranges from 2 to 10 hours and the ratio r defined above is within an interval ranging from 0.0020 to 0.5.

The ring-opening metathesis polymerization is a reaction that is well known to those skilled in the art, which is implemented here in the presence of a particular CTA compound of formula (E1), (E2) or (E'2).

(a) Metathesis Catalyst:

The metathesis catalyst is preferably a ruthenium-comprising catalyst and even more preferably a Grubbs catalyst.

Such a catalyst is generally a commercial product.

The metathesis catalyst is generally a transition metal catalyst, especially including a ruthenium-comprising catalyst, generally in the form of ruthenium complex(es), such as a ruthenium-carbene complex.

According to the invention, the term "Grubbs catalyst" generally means a $1^{st}$ or $2^{nd}$ generation Grubbs catalyst but also any other catalyst of Grubbs type (of ruthenium-carbene type) or Hoveyda-Grubbs type accessible to a person skilled in the art, for instance the substituted Grubbs catalysts described in U.S. Pat. No. 5,849,851.

A $1^{st}$ generation Grubbs catalyst is generally of formula (G1):

in which Ph is phenyl, Cy is cyclohexyl and the group $P(Cy)_3$ is a tricyclohexylphosphine group.

The IUPAC name of this compound is: benzylidenebis (tricyclohexylphosphine)dichlororuthenium (of CAS number 172222-30-9). Such a catalyst is available in particular from the company Aldrich.

A $2^{nd}$ generation (or G2) Grubbs catalyst is generally of formula (G2):

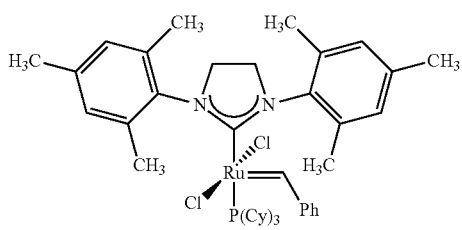

(G2)

in which Ph is phenyl and Cy is cyclohexyl.

The IUPAC name of the second generation of this catalyst is benzylidene[1,3-bis(2,4,6-trimethylphenyl)-2-imidazolidinylidene]dichloro(tricyclohexylphosphine)ruthenium (of CAS number 246047-72-3). This catalyst is also available from the company Aldrich.

(b) CTA of Formula (E1), (E2) or (E'2):

(b1) Implementation of a CTA of Formula (E1) or (E2) for the Preparation of the Polymer of Formula (I) According to the Invention in which $F^1$ and $F^2$ are the Monovalent Radicals Having the Respective Formulae (IIa) and (IIb):

In this case, effectively, the ring-opening metathesis polymerization reaction is performed in the presence of a monofunctional CTA of formula (E1) or of a difunctional CTA of formula (E2).

The CTA of formula (E1) is said to be monofunctional since it comprises only one epoxide group. The CTA of formula (E2) is said to be difunctional since it comprises two epoxide groups, which may be identical or different.

According to a first embodiment of process (b1) (known as the "monofunctional CTA route"), the CTA used is of formula (E1).

According to a first variant of the preparation process according to said monofunctional CTA route, the CTA of formula (E1) corresponds to formula (E1a) below:

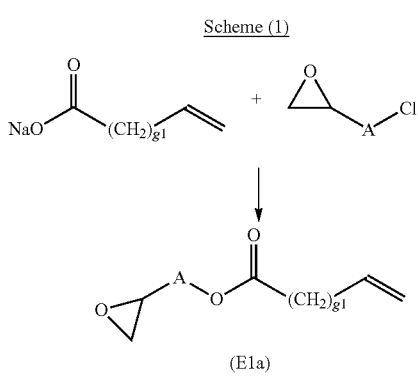

(E1a)

The compound of formula (E1a) may be obtained according to scheme (1) below, and by following the procedure described in patent application CN 102 757 409:

Scheme (1)

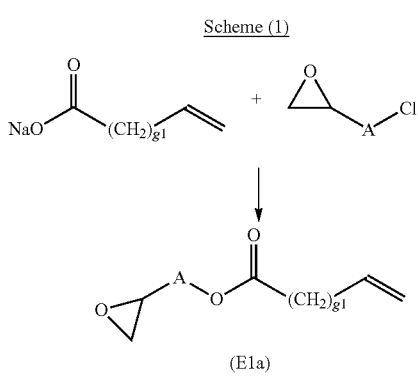

A particularly advantageous example of a CTA of formula (E1a) that may be mentioned is glycidyl acrylate of formula:

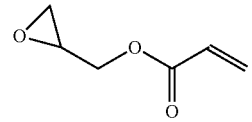

which is referred to simply hereinbelow by the name $CTA^1$.

According to a second variant of the preparation process according to said monofunctional CTA route, the CTA of formula (E1) corresponds to formula (E1 b) below:

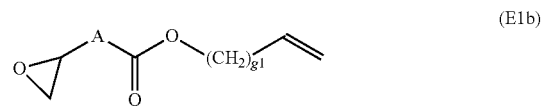

(E1b)

The compound of formula (E1b) may be obtained by transesterification according to scheme (2) below, in which Me denotes a methyl group, and by following one of the procedures described in the publication entitled "Kinetics of Epoxidation of Alkyl Esters of Undecylenic Acid: Comparison of Traditional Routes vs. Ishii-Venturello Chemistry" from G. D. Yadav and D. V. Satoskar (JAOCS, Vol. 74, No. 4 (1997), pages 397-407), especially those described in tables 9 and 10:

Scheme (2)

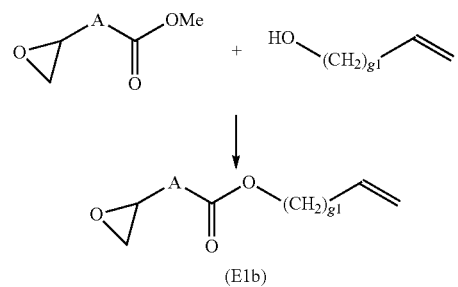

(E1b)

The epoxy-alkanoates used in this reaction may be synthesized by following the procedures described in patent applications U.S. Pat. No. 3,448,125 from Röhm & Haas and EP 0 208 272 from Montedison.

According to a second embodiment of process (b1) (known as the "difunctional CTA route"), the CTA used is of formula (E2).

According to a first variant of the preparation process according to said difunctional CTA route, the CTA of formula (E2) corresponds to formula (E2a) below:

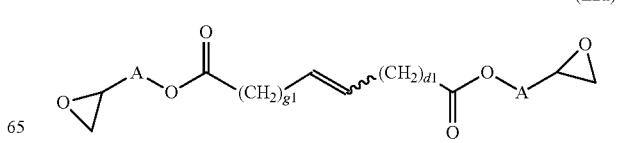

(E2a)

The compound of formula (E2a) may be obtained according to scheme (3) below, corresponding to a novel variant of scheme (1).

Scheme (3)

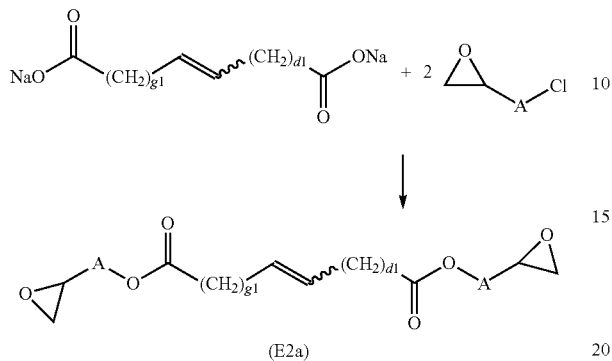

(E2a)

A particularly advantageous example of a CTA of formula (E2a) that may be mentioned is glycidyl fumarate (or glycidyl maleate, corresponding cis isomer) of formula:

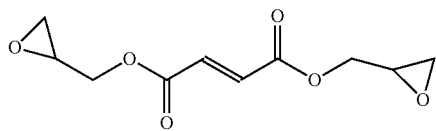 [SMILES: O=C(/C=C/C(=O)OCC1CO1)OCC1CO1]

which is referred to simply hereinbelow by the name CTA².

According to a second variant of the preparation process according to said difunctional CTA route, the CTA of formula (E2) corresponds to formula (E2b) below:

(E2b)

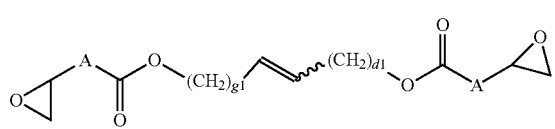

The compound of formula (E2b) may be obtained according to scheme (4) below, corresponding to a novel variant of scheme (2) in which Me also denotes a methyl group:

Scheme (4)

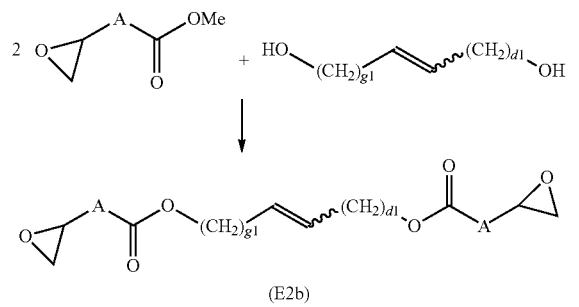

(E2b)

(b2) Implementation of a CTA of Formula (E'2) for the Preparation of the Polymer of Formula (I) According to the Invention in which $F^1$ and $F^2$ are the Monovalent Radicals Having the Respective Formulae (II'a) and (II'b):

In this case, effectively, the ring-opening metathesis polymerization reaction is performed in the presence of the difunctional CTA of formula (E'2):

(E'2)

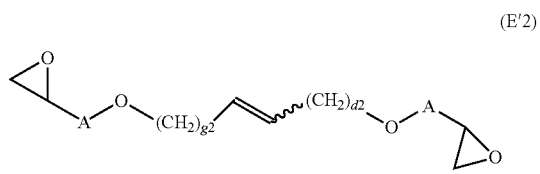

The compound of formula (E'2) may be obtained according to scheme (5) below, and by following the procedure with a phase-transfer catalyst described in patent application EP 0 911 326:

Scheme (5)

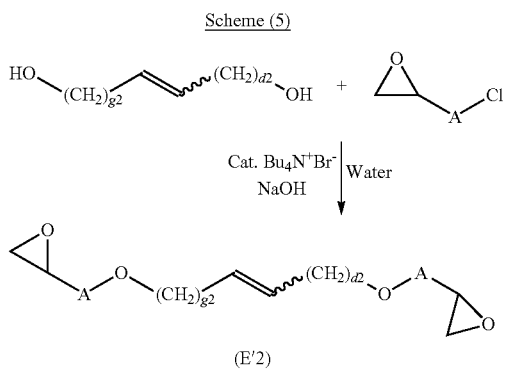

(E'2)

A particularly advantageous example of a CTA of formula (E'2) that may be mentioned is 2-butene-1,4-diol diglycidyl ether of formula:

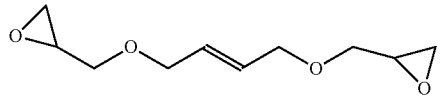 [SMILES: C(=C\COCC1CO1)/COCC1CO1]

which is referred to simply hereinbelow by the name CTA'².

(c) Compound of Formula (C):

(C)

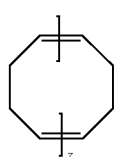

The cyclic compound of formula (C) generally comprises from 8 to 32 carbon atoms.

Preferably, it is chosen from the group formed by:
1,5-cyclooctadiene (denoted hereinbelow by COD) of formula:

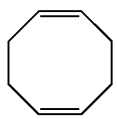

(corresponding to z=1)

and 1,5,9-cyclododecatriene (denoted hereinbelow by CDT) composed of 12 carbon atoms, of formula:

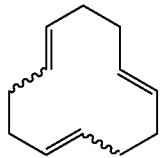 [SMILES: C1=CCC/C=C/CCC=CCC1]

(corresponding to z=2)

these two compounds being commercially available from the companies Evonik Degussa and Arkema France.

(d) Compound of Formula (D):

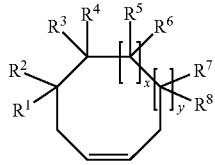

(D)

The compound of formula (D) generally comprises from 6 to 30 and preferably from 6 to 22 carbon atoms.

Preferably:

$R^1$, $R^2$, $R^3$, $R^4$, $R^5$, $R^6$, $R^7$ and $R^8$ represent a hydrogen atom or an alkyl radical comprising from 1 to 14 carbon atoms and more preferably from 1 to 8;

the integers x and y are within a range extending from 0 to 2, the sum x+y being within a range extending from 0 to 2.

According to an even more preferred variant:

x is equal to 1 and y is equal to 1 and/or at most one of the groups taken from ($R^1$, $R^2$, $R^3$, $R^4$, $R^5$, $R^6$, $R^7$ and $R^8$) is a $C_1$-$C_8$ alkyl radical and all the others represent a hydrogen atom.

The compound of formula (D) is especially chosen from:

cycloheptene, cyclooctene, cyclononene, cyclodecene, cycloundecene and cyclododecene, 5-epoxycyclooctene, of formula:

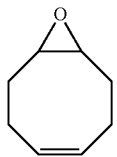

(available from Aldrich), 5-oxocyclooctene, of formula:

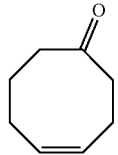

or else from a 5-alkylcyclooctene, of formula:

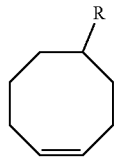

in which R is an alkyl radical comprising from 1 to 22 carbon atoms, preferably from 1 to 14 carbon atoms, R being, for example, the n-hexyl radical.

The compounds corresponding to the last two structural formulae above may be prepared via a process generalizing the reaction scheme of Example 8, especially by performing the alkylation of the intermediate 2 with a suitable Grignard reagent.

Among these compounds, cyclooctene and 5-n-hexylcyclooctene are most particularly preferred.

(e) Compound of Formula (E):

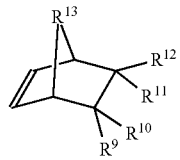

(E)

The compound of formula (E) generally comprises from 6 to 30 and preferably from 6 to 22 carbon atoms.

Preferably:

$R^9$, $R^{10}$, $R^{11}$ and $R^{12}$ represent a hydrogen atom or an alkyl or alkoxycarbonyl radical comprising from 1 to 14 and even more preferably from 1 to 8 carbon atoms;

the radical $R^0$ included in the group —$NR^0$, which is one of the meanings of $R^{13}$, is a linear radical comprising from 1 to 14 carbon atoms.

According to an even more preferred variant:

at most one of the groups taken from ($R^9$, $R^{10}$, $R^{11}$ and $R^{12}$) is a $C_1$-$C_8$ alkoxycarbonyl radical and all the others represent a hydrogen atom; and/or $R^{13}$ represents a —$CH_2$— radical or an oxygen atom.

The compound of formula (E) is especially chosen from:

norbornene, of following formula:

norbornadiene, of following formula:

dicyclopentadiene, of following formula:

7-oxanorbornene, of following formula:

7-oxanorbornadiene, of following formula:

5-ethylidene-2-norbornene, of following formula:

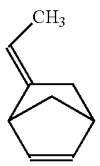

or else methyl 5-norbornene-2-acetate, of following formula:

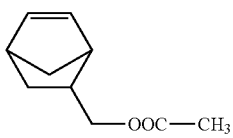

The compound of formula (E) may also be chosen from the compounds having the following formulae:

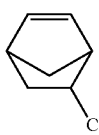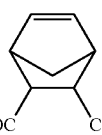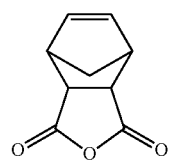

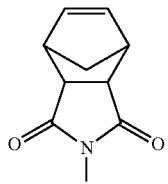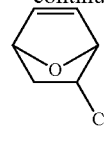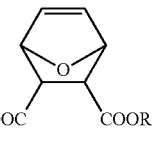

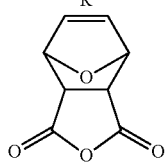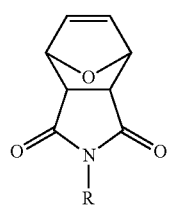

in which R is as defined previously for the compound of formula (D).

The compound of formula (E) may also be chosen from the group formed by the addition products (or adducts) resulting from the Diels-Alder reaction using cyclopentadiene or furan as starting material, and also the compounds derived from norbornene, such as the branched norbornenes as described in WO 2001/04173 (such as: norbornene isobornyl carboxylate, norbornene phenyl carboxylate, norbornene ethylhexyl carboxylate, norbornene phenoxyethyl carboxylate and alkyl norbornene dicarboxyimide, the alkyl generally comprising from 3 to 8 carbon atoms), and the branched norbornenes as described in WO 2011/038057 (norbornene dicarboxylic anhydrides and optionally 7-oxanorbornene dicarboxylic anhydrides).

Among the various compounds of formula (E) cited, the ones most particularly preferred are norbornene, 7-oxanorbornene, methyl 5-norbornene-2-carboxylate, of formula:

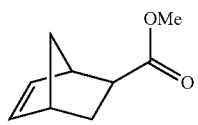

methyl 5-oxanorbornene-2-carboxylate, of formula:

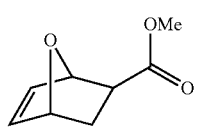 [SMILES: COC(=O)C1CC2C=CC1O2]

or else dicyclopentadiene.

Step (i) of ring-opening metathesis polymerization is generally performed in the presence of at least one solvent, generally chosen from the group formed by the aqueous or organic solvents typically used in polymerization reactions and which are inert under the abovementioned polymerization conditions.

Step (ii) of dithiocarbonation and/or the optional hydrogenation step may be performed in the same solvent as step (i).

In particular, when the same solvent is used, the hydrocarbon-based polymer bearing dithiocyclocarbonate end groups according to the invention may be generated by successively performing step (i) and step (ii), without the need to isolate—between the two steps (i) and (ii)—the polymer bearing epoxy end groups of formula (V) or (V') derived from step (i).

As examples of solvents that may be implemented, mention may be made of aromatic hydrocarbons, chlorinated hydrocarbons, ethers, aliphatic hydrocarbons, alcohols and water, or mixtures thereof.

The solvent is preferably chosen from the group formed by benzene, toluene, para-xylene, methylene chloride, dichloroethane, dichlorobenzene, chlorobenzene, tetrahydrofuran, diethyl ether, pentane, hexane, heptane, methanol, ethanol and water, or mixtures thereof.

More preferentially, the solvent is chosen from the group formed by benzene, toluene, para-xylene, methylene chloride, dichloroethane, dichlorobenzene, chlorobenzene, tetrahydrofuran, diethyl ether, pentane, hexane, heptane, methanol, ethanol, and mixtures thereof.

Better still, the solvent is toluene, heptane or a mixture of toluene and methylene chloride. The solubility of the polymer formed during the polymerization reaction depends generally and mainly on the choice of the solvent and on the molar mass of the polymer obtained. It is also possible for the reaction to be performed without solvent.

As regards the dithiocarbonation step (ii), carbon disulfide ($CS_2$) and the polymer bearing epoxy end groups derived from step (i) are generally used in stoichiometric proportion, i.e., two moles of carbon disulfide are reacted with one mole of polymer bearing epoxy end groups derived from step (i), so that all of the epoxy functions of said polymer are reacted with carbon disulfide. A slight variation relative to the stoichiometries given previously, especially a slight deficit of $CS_2$, may be envisaged without inconvenience. In the latter case, it may be envisaged to work, for example, with a mole ratio of the amount of $CS_2$ to the amount of polymer bearing epoxy end groups of formula (V) or (V') derived from step (i) ranging from 0.96 to 1.

The invention also relates to the use, as adhesive, of the hydrocarbon-based polymer comprising two dithiocyclocarbonate end groups, as defined previously, as a mixture with an amine compound comprising at least two amine groups, for example chosen from diamines, triamines and higher homologues.

Said hydrocarbon-based polymer reacts with the amine compound to form a poly(thio)urethane. The term "poly(thio)urethane" means a polymer comprising at least two (thio)urethane groups (or else S-thiocarbamate, corresponding especially to the formula —O(C=S)—NH—).

The amine compounds that may be used according to the invention are preferably such that all the amine groups are primary amine groups. These amine compounds may be oligomers. These oligomers generally have a number-average molar mass of less than 2000 g/mol.

The temperature at which the polymer bearing dithiocyclocarbonate end groups may be implemented, as adhesive, as a mixture with the amine compound is a temperature below 100° C., or even room temperature (i.e., about 23° C.) when said polymer is liquid at 23° C.

It has been observed that, under identical temperature conditions, and in the presence of the same amine compound, the reaction for formation of the poly(thio)urethane constituting the adhesive seal is faster than that associated with the implementation as adhesive of the hydrocarbon-based polymer bearing (2-oxo-1,3-dioxolan-4-yl) end groups according to patent application WO 2014/091173.

The amounts of the hydrocarbon-based polymer and of the amine compound correspond to stoichiometric amounts, i.e., the mole ratio of the number of azlactone groups to the number of amine groups ranges from 0.8 to 1.2, preferably from 0.9 to 1.1, or even is about 1.0.

In practice, the hydrocarbon-based polymer and the amine compound, used as curing agent, are advantageously each included in a component of a two-pack composition which is made available to the user. Said user thus, at the time of use of the adhesive, mixes these two components, optionally under hot conditions, so as to obtain a liquid adhesive composition.

The invention also relates to a process for assembling two substrates by bonding, comprising:
  coating at least one of the two substrates to be assembled with a liquid adhesive composition obtained by mixing an amine compound comprising at least two amine groups with the hydrocarbon-based polymer comprising two dithiocyclocarbonate end groups as defined previously; and then
  actually bringing the two substrates into contact.

The liquid adhesive composition is either the adhesive composition comprising said compounds and said polymer in liquid form at room temperature or the molten adhesive composition under hot conditions. A person skilled in the art is capable of working so that the adhesive composition used is in liquid form at the time of its use.

The coating with the liquid adhesive composition is preferably performed in the form of a layer with a thickness within a range from 0.3 to 5 mm, preferably from 1 to 3 mm, on at least one of the two surfaces which respectively belong to the two substrates to be assembled and which are intended to be brought into contact with each other along a contact surface. The actual bringing into contact of the two substrates is then performed along their contact surface.

Needless to say, the coating operation and the contacting operation have to be performed within a compatible time interval, as is well known to those skilled in the art, i.e., before the adhesive layer applied to the substrate loses its ability to attach, by adhesive bonding, this substrate to another substrate. In general, the polycondensation of the hydrocarbon-based polymer with the amine compound begins to take place during the coating operation and then continues to take place during the step in which the two substrates are brought into contact.

The appropriate substrates are, for example, inorganic substrates, such as glass, ceramics, concrete, metals or alloys (such as aluminium alloys, steel, non-ferrous metals and galvanized metals); or else organic substrates, such as wood, plastics, such as PVC, polycarbonate, PMMA, polyethylene, polypropylene, polyesters or epoxy resins; substrates made of metal and composites coated with paint (as in the motor vehicle field).

Without further elaboration, it is believed that one skilled in the art can, using the preceding description, utilize the present invention to its fullest extent. The preceding preferred specific embodiments are, therefore, to be construed as merely illustrative, and not imitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1657777, filed Aug. 16, 2016 are incorporated by reference herein.

The examples that follow are given purely by way of illustration of the invention and should not be interpreted in order to limit the scope thereof.

Examples 1 to 15 describe the preparation of polymers comprising two dithiocyclocarbonate end groups involving a ring-opening metathesis polymerization step.

EXAMPLE 1: SYNTHESIS OF A POLYMER COMPRISING TWO (2-THIONE-1,3-OXATHIOLAN-4-YL)-METHYLENE-ESTER END GROUPS WITH A STEP OF POLYMERIZATION OF COD IN THE PRESENCE OF $CTA^1$

Step (i):
Commercially available 1,5-cyclooctadiene (known as COD) is used, and, as chain-transfer agent, $CTA^1$:

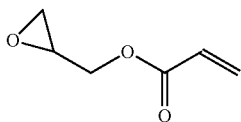

1,5-Cyclooctadiene (10.8 mmol), benzoquinone (0.54 mmol) and dry $CH_2Cl_2$ (5 ml) are introduced into a 20 ml round-bottomed flask in which was also placed a Teflon®-coated magnetic stirring bar. The round-bottomed flask and its contents are subsequently placed under argon.

The compound $CTA^1$ (0.54 mmol) is subsequently added with stirring to the round-bottomed flask via a syringe. The ratio of the reagents, expressed as number of moles: $CTA^1$/COD is 0.050.

The round-bottomed flask is then immersed in an oil bath at 40° C. and the catalyst G2 defined previously (5.4 µmol) in solution in $CH_2Cl_2$ (2 ml) is then immediately added using a cannula.

The reaction mixture becomes very viscous within the space of 2 minutes. The viscosity subsequently slowly decreases over the following 10 minutes.

After 8 hours, counting from the addition of the catalyst, the product present in the round-bottomed flask is extracted after evaporation of the solvent under vacuum. The product is then recovered in the form of a colourless solid powder, after precipitating from methanol, filtering and drying at 20° C. under vacuum, in a yield of greater than 90%.

Step (ii):
The product isolated above (10.00 mmol), lithium bromide (10.00 mmol) and dry THF (10 ml) were placed in a 20 ml round-bottomed flask in which was also placed a Teflon®-coated magnetic stirring bar. The round-bottomed flask and its contents were subsequently placed under argon. Carbon sulfide (20.00 mmol) was then introduced dropwise by syringe into the round-bottomed flask. The round-bottomed flask was then immersed in an oil bath at 40° C. for 17 hours. A product was recovered after precipitating from methanol (20 ml), filtering and drying at 23° C. under vacuum.

The polymer obtained is solid at room temperature.

$^1$H NMR ($CDCl_3$, 500 MHz, 25° C.) and $^{13}$C NMR ($CDCl_3$, 125 MHz, 25° C.) analyses of said polymer give the following values:

$^1$H NMR: δ (ppm) repeating unit 2.10 (4H*n), 5.43 (2H*n), end group=3.60 O—C(S)—S—$CH_2$—CH—$CH_2$—O—C(O)—CH=CH, 4.49 O—C(S)—S—$CH_2$—CH—$CH_2$—O—C(O)—CH=CH, 5.39 O—C(S)—S—$CH_2$—CH—$CH_2$—O—C(O)—CH=CH, 5.85 O—C(S)—S—$CH_2$—CH—$CH_2$—O—C(O)—CH=CH, 7.08 O—C(S)—S—$CH_2$—CH—$CH_2$O—C(O)—CH=CH.

$^{13}$C NMR: δ (ppm) repeating unit 27.4, 32.7, 131.4, end group=36.1 O—C(S)—S—$CH_2$—CH—$CH_2$—O—C(O), 62.7 O—C(S)—S—$CH_2$CH—$CH_2$O—C(O), 87.7 O—C(S)—S—$CH_2$—CH—$CH_2$—O—C(O), 119.9 O—C(S)—S—$CH_2$—CH—$CH_2$—O—C(O)CH=CH, 152.1 O—C(S)—S—$CH_2$—CH—$CH_2$—O—C(O)CH=CH, 166.2 O—C(S)—S—$CH_2$—CH—$CH_2$—O—C(O), 210.2 O—C(S)—S—$CH_2$—CH—$CH_2$—O—C(O).

These values confirm the structure below:

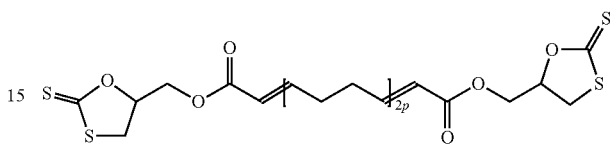

This structure is indeed covered by formula (IV') defined previously.

The number-average molecular mass Mn, measured by NMR, is 4700 g/mol.

The polydispersity index, equal to the ratio Mw/Mn (measured by size exclusion chromatography with polystyrene standard), is 1.60.

EXAMPLE 2: SYNTHESIS OF A POLYMER COMPRISING TWO (2-THIONE-1,3-OXATHIOLAN-4-YL)-METHYLENE-ESTER END GROUPS WITH A STEP OF POLYMERIZATION OF CDT IN THE PRESENCE OF $CTA^2$

Example 1 is repeated, replacing in step (i):
the COD with 1,5,9-cyclododecatriene (referred to hereinbelow as CDT), which is commercially available, for example from the company Sigma-Aldrich;
the 0.54 mmol of $CTA^1$ with 0.27 mmol of the compound $CTA^2$ of formula:

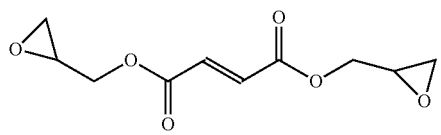 [SMILES: O=C(/C=C/C(=O)OCC1CO1)OCC1CO1]

such that the ratio of the reagents, expressed as number of moles: $CTA^2$/CDT is 0.025, and without introducing benzoquinone.

At the end of step (ii), a polymer is also recovered in the form of a colourless solid powder, the $^1$H NMR/$^{13}$C NMR analysis of which is identical to the polymer of Example 1, thus confirming the structure below:

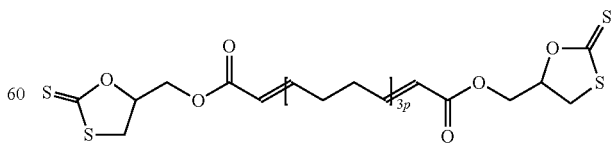

which is thus also covered by formula (IV') defined previously.

The number-average molecular mass Mn and the polydispersity index are, respectively, 6900 g/mol and 1.80.

EXAMPLE 3: SYNTHESIS OF A POLYMER COMPRISING TWO (2-THIONE-1,3-OXATHIOLAN-4-YL)-METHYLENE-ETHER END GROUPS WITH A STEP OF POLYMERIZATION OF CDT IN THE PRESENCE OF CTA'²

Example 2 is repeated, replacing, as chain-transfer agent, CTA² with CTA'² of formula:

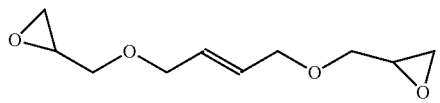 [SMILES: C(=C\COCC1CO1)/COCC1CO1]

At the end of step (ii), a polymer is also recovered in the form of a colourless solid powder, the $^1$H NMR/$^{13}$C NMR analysis of which gives the following values:

$^1$H NMR: δ (ppm) repeating unit 2.10 (4H*n), 5.43 (2H*n), end group=3.60 O—C(S)—S—CH₂—CH—CH₂—O—, 4.04 O—C(S)—S—CH₂—CH—CH₂—O—CH₂, 4.49 O—C(S)—S—CH₂—CH—CH₂—O—, 5.39 O—C(S)—S—CH₂—CH—CH₂—O.

$^{13}$C NMR: δ (ppm) repeating unit 27.4, 32.7, 131.4, end group=41.5 O—C(S)—S—CH₂—CH—CH₂—O—, 69.1 O—C(S)—S—CH₂—CH—CH₂—O—CH₂, 73.9 O—C(S)—S—CH₂—CH—CH₂—O—, 88.3 O—C(S)—S—CH₂—CH—CH₂—O—, 210.2 O—C(S)—S—CH₂—CH—CH₂—O.

These values confirm the structure below:

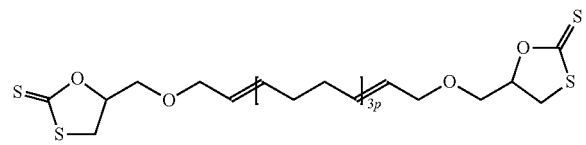

This structure is indeed covered by formula (IV') defined previously.

The number-average molecular mass Mn and the polydispersity index are, respectively, 6800 g/mol and 1.80.

EXAMPLE 4: SYNTHESIS OF A POLYMER COMPRISING TWO (2-THIONE-1,3-OXATHIOLAN-4-YL)-METHYLENE-ESTER END GROUPS WITH A STEP OF POLYMERIZATION OF CDT AND NORBORNENE (CYCLOOLEFIN OF FORMULA (E)) IN THE PRESENCE OF CTA²

Example 2 is repeated, the 10.8 mmol of CDT being replaced with a mixture of 5.4 mmol of CDT and of 5.4 mmol of norbornene, of formula:

available from the company Sigma-Aldrich.

The ratio of the reagents, expressed as number of moles: CTA²/(CDT+norbornene), is 0.025.

At the end of step (ii), a liquid copolymer is obtained, NMR analysis of which gives the following values:

$^1$H NMR: δ (ppm) repeating unit trans: 1.08 (2H*n), 1.39 (4H*n), 2.07 (4H*n), 2.47 (2H*n trans), 5.24-5.44 (4H*n trans), repeating unit cis: 1.82-1.91 (6H*n), 2.07 (4H*n), 2.82 (2H*n cis), 5.24-5.44 (4H*n cis), end group=3.60 O—C(S)—S—CH₂—CH—CH₂—O—C(O)—CH=CH, 4.49 O—C(S)—S—CH₂—CH—CH₂—O—C(O)—CH=CH, 5.39 O—C(S)—S—CH₂—CH—CH₂—O—C(O)CH=CH, 5.85 O—C(S)—S—CH₂—CH—CH₂—O—C(O)—CH=CH, 7.08 O—C(S)—S—CH₂—CH—CH₂—O—C(O)—CH=CH.

$^{13}$C NMR: δ (ppm) repeating unit: 27.4, 33.1, 42.1, 43.4, 130.3, 133.1, end group=36.1 O—C(S)—S—CH₂—CH—CH₂—O—C(O), 62.7 O—C(S)—S—CH₂—CH—CH₂—O—C(O), 87.7 O—C(S)—S—CH₂—CH—CH₂—O—C(O), 119.9 O—C(S)—S—CH₂—CH—CH₂—O—C(O)—CH=CH, 152.1 O—C(S)—S—CH₂—CH—CH₂—O—C(O)CH=CH, 166.2 O—C(S)—S—CH₂—CH—CH₂—O—C(O), 210.2 O—C(S)—S—CH₂—CH—CH₂—O—C(O).

These values confirm the structure below:

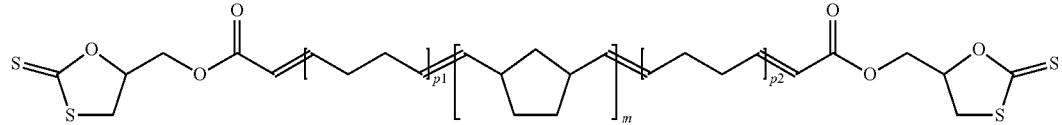

This structure is indeed covered by the formula (III') defined above.

The number-average molecular mass Mn and the polydispersity index are respectively 5500 g/mol and 1.60.

EXAMPLE 5: SYNTHESIS OF A POLYMER COMPRISING TWO (2-THIONE-1,3-OXATHIOLAN-4-YL)-METHYLENE-ETHER END GROUPS WITH A STEP OF POLYMERIZATION OF CDT AND NORBORNENE IN THE PRESENCE OF CTA'²

Example 4 is repeated, replacing the CTA² with CTA'².

At the end of step (ii), a liquid copolymer is obtained, NMR analysis of which gives the following values:

$^1$H NMR: δ (ppm) repeating unit trans: 1.08 (2H*n), 1.39 (4H*n), 2.07 (4H*n), 2.47 (2H*n trans), 5.24-5.44 (4H*n trans), repeating unit cis: 1.82-1.91 (6H*n), 2.07 (4H*n), 2.82 (2H*n cis), 5.24-5.44 (4H*n cis), end group=3.60 O—C(S)—S—CH₂—CH—CH₂—O—, 4.04 O—C(S)—S—CH₂—CH—CH₂—O—CH₂, 4.49 O—C(S)—S—CH₂—CH—CH₂—O—, 5.39 O—C(S)—S—CH₂—CH—CH₂—O—.

$^{13}$C NMR: δ (ppm) repeating unit: 27.4, 33.1, 42.1, 43.4, 130.3, 133.1, end group=41.5 O—C(S)—S—CH₂—CH—CH₂—O—, 69.1 O—C(S)—S—CH₂—CH—CH₂—O—CH₂, 73.9 O—C(S)—S—CH₂—CH—CH₂—O—, 88.3 O—C(S)—S—CH₂—CH—CH₂—O—, 210.2 O—C(S)—S—CH₂—CH—CH₂—O—.

These values confirm the structure below:

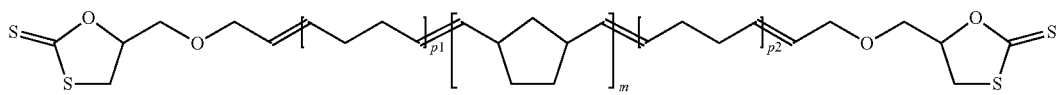

This structure is indeed covered by formula (III') defined previously.

The number-average molecular mass Mn and the polydispersity index are, respectively, 5400 g/mol and 1.60.

EXAMPLE 6: SYNTHESIS OF A POLYMER COMPRISING TWO (2-THIONE-1,3-OXATHIOLAN-4-YL)-METHYLENE-ESTER END GROUPS WITH A STEP OF POLYMERIZATION OF CDT AND METHYL 5-NORBORNENE-2-CARBOXYLATE (CYCLOOLEFIN OF FORMULA (E)) IN THE PRESENCE OF CTA$^2$

Example 4 is repeated, replacing the norbornene with methyl 5-norbornene-2-carboxylate, of formula:

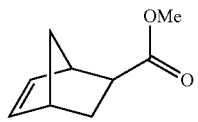 [SMILES: COC(=O)C1CC2C=CC1C2]

available from the company Sigma-Aldrich.

A copolymer that is liquid at room temperature is also obtained, NMR analysis of which gives the following values:

$^1$H NMR: δ (ppm) repeating unit 1.08-1.26 (1H*n), 1.56-1.99 (3H*n), 2.07 (4H*n), 2.44-3.02 (3H*n), 5.13-5.29 (4H*n), end group=3.60 O—C(S)—S—CH$_2$—CH—CH$_2$—O—C(O)—CH=CH, 4.49 O—C(S)—S—CH$_2$—CH—CH$_2$—O—C(O)—CH=CH, 5.39 O—C(S)—S—CH$_2$—CH—CH$_2$—O—C(O)—CH=CH, 5.85 O—C(S)—S—CH$_2$—CH—CH$_2$—O—C(O)CH=CH, 7.08 O—C(S)—S—CH$_2$—CH—CH$_2$—O—C(O)CH=CH.

$^{13}$C NMR: δ (ppm) repeating unit: 27.4, 33.1, 36.1-42.9, 130.3, 133.1, end group=36.1 O—C(S)—S—CH$_2$—CH—CH$_2$—O—C(O), 62.7 O—C(S)—S—CH$_2$—CH—CH$_2$—O—C(O), 87.7 O—C(S)—S—CH$_2$—CH—CH$_2$—O—C(O), 119.9 O—C(S)—S—CH$_2$—CH—CH$_2$—O—C(O)—CH=CH, 152.1 O—C(S)—S—CH$_2$—CH—CH$_2$—O—C(O)—CH=CH, 166.2 O—C(S)—S—CH$_2$—CH—CH$_2$O—C(O), 210.2 O—C(S)—S—CH$_2$—CH—CH$_2$—O—C(O).

These values confirm the structure:

This structure is indeed covered by formula (III') defined previously.

The number-average molecular mass Mn and the polydispersity index are, respectively, 6600 g/mol and 1.70.

EXAMPLE 7: SYNTHESIS OF A POLYMER COMPRISING TWO (2-THIONE-1,3-OXATHIOLAN-4-YL)-METHYLENE-ETHER END GROUPS WITH A STEP OF POLYMERIZATION OF CDT AND METHYL 5-NORBORNENE-2-CARBOXYLATE (CYCLOOLEFIN OF FORMULA (E)) IN THE PRESENCE OF CTA'$^2$

Example 6 is repeated, replacing the CTA$^2$ with CTA'$^2$.

At the end of step (ii), a liquid copolymer is obtained, NMR analysis of which gives the following values:

$^1$H NMR: δ (ppm) repeating unit 1.08-1.26 (1H*n), 1.56-1.99 (3H*n), 2.07 (4H*n), 2.44-3.02 (3H*n), 5.13-5.29 (4H*n), end group=3.60 O—C(S)—S—CH$_2$—CH—CH$_2$—O—, 4.04 O—C(S)—S—CH$_2$—CH—CH$_2$—O—CH$_2$, 4.49 O—C(S)—S—CH$_2$—CH—CH$_2$—O—, 5.39 O—C(S)—S—CH$_2$—CH—CH$_2$—O—.

$^{13}$C NMR: δ (ppm) repeating unit: 27.4, 33.1, 36.1-42.9, 130.3, 133.1, end group=41.5 O—C(S)—S—CH$_2$—CH—CH$_2$—O—, 69.1 O—C(S)—S—CH$_2$—CH—CH$_2$—O—CH$_2$, 73.9 O—C(S)—S—CH$_2$—CH—CH$_2$—O—, 88.3 O—C(S)—S—CH$_2$—CH—CH$_2$—O—, 210.2 O—C(S)—S—CH$_2$—CH—CH$_2$—O—.

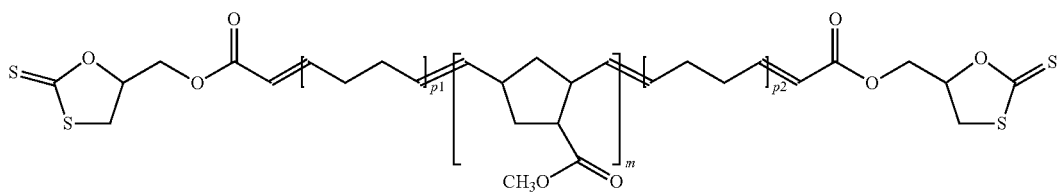

These values confirm the structure:

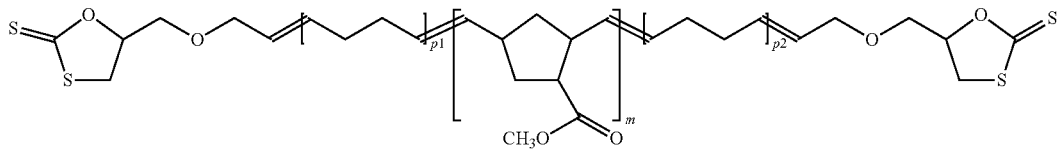

This structure is indeed covered by formula (III') defined previously.

The number-average molecular mass Mn and the polydispersity index are, respectively, 6600 g/mol and 1.60.

EXAMPLE 8: SYNTHESIS OF A POLYMER COMPRISING TWO (2-THIONE-1,3-OXATHIOLAN-4-YL)-METHYLENE-ESTER END GROUPS WITH A STEP OF POLYMERIZATION OF CDT AND METHYL 5-OXANORBORNENE-2-CARBOXYLATE (CYCLOOLEFIN OF FORMULA (E)) IN THE PRESENCE OF CTA$^2$

Example 4 is repeated, replacing the norbornene with methyl 5-oxanorbornene-2-carboxylate, of formula:

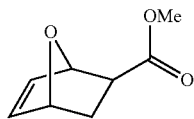 [SMILES: COC(=O)C1CC2C=CC1O2]

available from the company Boc Sciences.

A copolymer that is liquid at room temperature is also obtained, NMR analysis of which gives the following values:

$^1$H NMR: δ (ppm) repeating unit 2.07 (4H*n), 2.16-2.36 (2H*n), 2.79 (1H*n), 4.44-4.74 (2H*n), 5.60-5.77 (4H*n), end group=3.60 O—C(S)—S—CH$_2$—CH—CH$_2$—O—C(O)—CH=CH, 4.49 O—C(S)—S—CH$_2$—CH—CH$_2$O—C(O)—CH=CH, 5.39 O—C(S)—S—CH$_2$—CH—CH$_2$—O—C(O)—CH=CH, 5.85 O—C(S)—S—CH$_2$—CH—CH$_2$—O—C(O)CH=CH, 7.08 O—C(S)—S—CH$_2$CH—CH$_2$O—C(O)—CH=CH.

$^{13}$C NMR: δ (ppm) repeating unit: 27.4, 33.1, 36.23, 49.4-53.5, 78.8, 81.7, 130.3, 133.1, end group=36.1 O—C(S)—S—CH$_2$—CH—CH$_2$—O—C(O), 62.7 O—C(S)—S—CH$_2$—CH—CH$_2$—O—C(O), 87.7 O—C(S)—S—CH$_2$CH—CH$_2$—O—C(O), 119.9 O—C(S)—S—CH$_2$CH—CH$_2$—O—C(O)—CH=CH, 152.1 O—C(S)—S—CH$_2$—CH—CH$_2$—O—C(O)—CH=CH, 166.2 O—C(S)—S—CH$_2$—CH—CH$_2$—O—C(O), 210.2 O—C(S)—S—CH$_2$CH—CH$_2$—O—C(O).

These values confirm the structure:

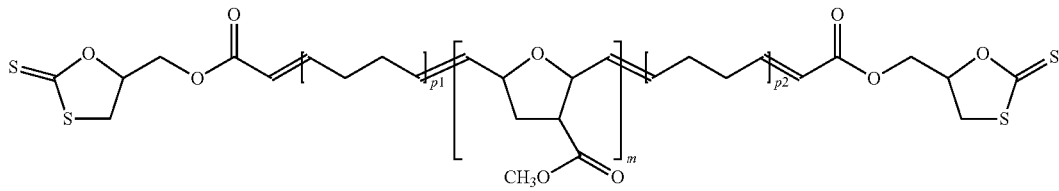

which is indeed covered by formula (III') defined previously.

The number-average molecular mass Mn and the polydispersity index are, respectively, 6600 g/mol and 1.70.

EXAMPLE 9: SYNTHESIS OF A POLYMER COMPRISING TWO (2-THIONE-1,3-OXATHIOLAN-4-YL)-METHYLENE-ETHER END GROUPS WITH A STEP OF POLYMERIZATION OF CDT AND METHYL 5-OXANORBORNENE-2-CARBOXYLATE IN THE PRESENCE OF CTA'$^2$

Example 8 is repeated, replacing the CTA$^2$ with CTA'$^2$.

At the end of step (ii), a liquid copolymer is obtained, NMR analysis of which gives the following values:

$^1$H NMR: δ (ppm) repeating unit 2.07 (4H*n), 2.16-2.36 (2H*n), 2.79 (1H*n), 4.44-4.74 (2H*n), 5.60-5.77 (4H*n), end group=3.60 O—C(S)—S—CH$_2$—CH—CH$_2$—O—, 4.04 O—C(S)—S—CH$_2$—CH—CH$_2$—O—CH$_2$, 4.49 O—C(S)—S—CH$_2$—CH—CH$_2$—O—, 5.39 O—C(S)—S—CH$_2$—CH—CH$_2$—O—.

$^{13}$C NMR: δ (ppm) repeating unit: 27.4, 33.1, 36.23, 49.4-53.5, 78.8, 81.7, 130.3, 133.1, end group=41.5 O—C(S)—S—CH$_2$—CH—CH$_2$—O—, 69.1 O—C(S)—S—CH$_2$—CH—CH$_2$—O—CH$_2$, 73.9 O—C(S)—S—CH$_2$—CH—CH$_2$—O—, 88.3 O—C(S)—S—CH$_2$—CH—CH$_2$—O—, 210.2 O—C(S)—S—CH$_2$—CH—CH$_2$—O—.

These values confirm the structure:

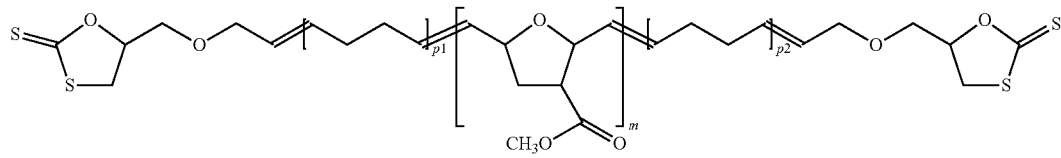

which is indeed covered by formula (III') defined previously.

The number-average molecular mass Mn and the polydispersity index are respectively 6500 g/mol and 1.80.

EXAMPLE 10: SYNTHESIS OF A POLYMER COMPRISING TWO (2-THIONE-1,3-OXATHIO-LAN-4-YL)-METHYLENE-ESTER END GROUPS WITH A STEP OF POLYMERIZATION OF CDT AND DICYCLOPENTADIENE (CY-CLOOLEFIN OF FORMULA (E)) IN THE PRESENCE OF CTA²

Example 4 is repeated, replacing the norbornene with dicyclopentadiene, of formula:

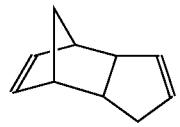

available from the company Sigma-Aldrich.

A copolymer that is liquid at room temperature is also obtained, NMR analysis of which gives the following values:

$^1$H NMR (CDCl$_3$, 500 MHz, 298 K): δ (ppm) repeating unit 1.24 (1H*n), 1.59 (1H*n), 2.07 (4H*n), 2.26 (2H*n), 2.62 (1H*n), 2.85 (2H*n), 3.24 (1H*n), 5.36-5.68 (4H*n), end group=3.60 O—C(S)—S—CH$_2$CH—CH$_2$—O—C(O)CH=CH, 4.49 O—C(S)—S—CH$_2$—CH—CH$_2$—O—C(O)CH=CH, 5.39 O—C(S)—S—CH$_2$—CH—CH$_2$—O—C(O)—CH=CH, 5.85 O—C(S)—S—CH$_2$—CH—CH$_2$—O—C(O)—CH=CH, 7.08 O—C(S)—S—CH$_2$—CH—CH$_2$—O—C(O)—CH=CH.

$^{13}$C NMR (CDCl$_3$, 125 MHz, 298 K): δ (ppm) repeating unit 27.4, 33.1, 35.1, 38.0, 42.3, 46.0, 47.0, 55.4, 130.5, end group=36.1 O—C(S)—S—CH$_2$—CH—CH$_2$—O—C(O), 62.7 O—C(S)—S—CH$_2$CH—CH$_2$—O—C(O), 87.7 O—C(S)—S—CH$_2$—CH—CH$_2$—O—C(O), 119.9 O—C(S)—S—CH$_2$—CH—CH$_2$—O—C(O)—CH=CH, 152.1 O—C(S)—S—CH$_2$—CH—CH$_2$—O—C(O)CH=CH, 166.2 O—C(S)—S—CH$_2$—CH—CH$_2$—O—C(O), 210.2 O—C(S)—S—CH$_2$—CH—CH$_2$—O—C(O).

These values confirm the structure:

This structure is indeed covered by the formula (III') defined above.

The number-average molecular mass Mn and the polydispersity index are respectively 6300 g/mol and 2.00.

EXAMPLE 11: SYNTHESIS OF A POLYMER COMPRISING TWO (2-THIONE-1,3-OXATHIOLAN-4-YL)-METHYLENE-ETHER END GROUPS WITH A STEP OF POLYMERIZATION OF CDT AND DICYCLOPENTADIENE IN THE PRESENCE OF CTA'²

Example 10 is repeated, replacing the CTA² with CTA'².

At the end of step (ii), a liquid copolymer is obtained, NMR analysis of which gives the following values:

$^1$H NMR: δ (ppm) repeating unit 1.24 (1H*n), 1.59 (1H*n), 2.07 (4H*n), 2.26 (2H*n), 2.62 (1H*n), 2.85 (2H*n), 3.24 (1H*n), 5.36-5.68 (4H*n), end group=3.60 O—C(S)—S—CH$_2$—CH—CH$_2$—O—, 4.04 O—C(S)—S—CH$_2$—CH—CH$_2$—O—CH$_2$, 4.49 O—C(S)—S—CH$_2$—CH—CH$_2$—O—, 5.39 O—C(S)—S—CH$_2$—CH—CH$_2$—O—.

$^{13}$C NMR: δ (ppm) repeating unit 27.4, 33.1, 35.1, 38.0, 42.3, 46.0, 47.0, 55.4, 130.5, end group=41.5 O—C(S)—S—CH$_2$—CH—CH$_2$—O—, 69.1 O—C(S)—S—CH$_2$—CH—CH$_2$—O—CH$_2$, 73.9 O—C(S)—S—CH$_2$—CH—CH$_2$—O—, 88.3 O—C(S)—S—CH$_2$—CH—CH$_2$—O—, 210.2 O—C(S)—S—CH$_2$—CH—CH$_2$—O—.

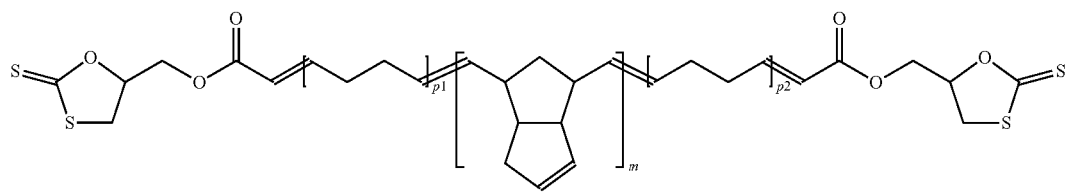

These values confirm the structure:

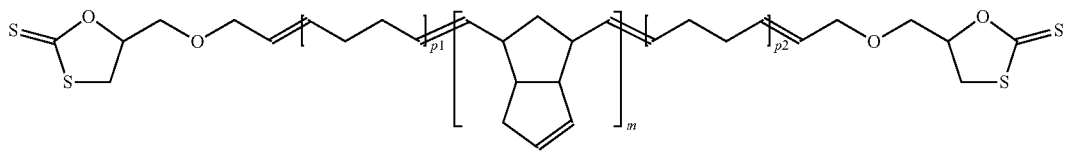

which is indeed covered by formula (III') defined previously.

The number-average molecular mass Mn and the polydispersity index are respectively 6300 g/mol and 1.90.

EXAMPLE 12: SYNTHESIS OF A POLYMER COMPRISING TWO (2-THIONE-1,3-OXATHIOLAN-4-YL)-METHYLENE-ESTER END GROUPS WITH A STEP OF POLYMERIZATION OF CDT AND 5-N-HEXYLCYCLOOCTENE (CYCLOOLEFIN OF FORMULA (D)) IN THE PRESENCE OF CTA$^2$

The 5-n-hexylcyclooctene used in this example was synthesized via the route indicated in the reaction scheme below (cf. compound 5):

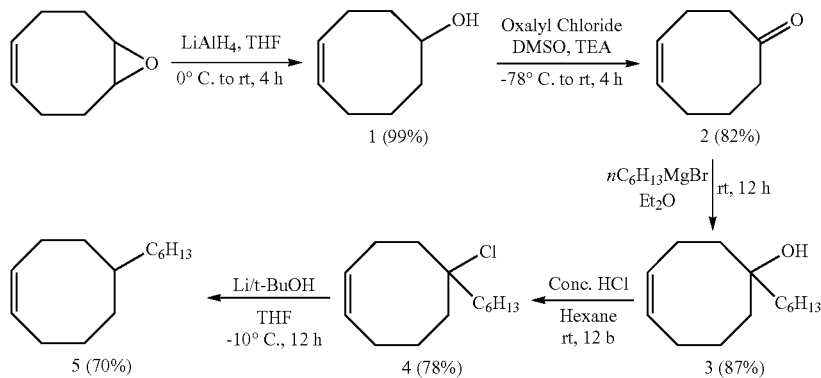

The starting materials (especially 5,6-epoxycyclooctene), reagents and solvents used during these syntheses are commercial products from the company Sigma-Aldrich. For further details, reference is made to the publication by A. Diallo et al. (Polymer Chemistry, Vol. 5, Issue 7, 7 Apr. 2014, pages 2583-2591), or else to the reference Kobayashi et al, J. Am. Chem. Soc. 2011, 133, pages 5794-5797).

Example 4 is repeated, replacing the norbornene with 5-n-hexylcyclooctene.

A copolymer that is liquid at room temperature is also obtained, NMR analysis of which gives the following values:

$^1$H NMR: δ (ppm) repeating unit 0.83 (3H*n), 1.27 (16H*n), 2.07 (4H*n), 2.17 (5H*n), 5.37 (2H*n), end group=3.60 O—C(S)—S—CH$_2$—CH—CH$_2$—O—C(O)—CH=CH, 4.49 O—C(S)—S—CH$_2$—CH—CH$_2$—O—C(O)—CH=CH, 5.39 O—C(S)—S—CH$_2$—CH—CH$_2$—O—C(O)—CH=CH, 5.85 O—C(S)—S—CH$_2$CH—CH$_2$—O—C(O)—CH=CH, 7.08 O—C(S)—S—CH$_2$—CH—CH$_2$—O—C(O)—CH=CH.

$^{13}$C NMR: δ (ppm) repeating unit 14.1, 22.7, 27.4, 29.6, 31.8, 32.4, 33.1, 33.8, 40.6, 130.5, end group=36.1 O—C(S)—S—CH$_2$—CH—CH$_2$—O—C(O), 62.7 O—C(S)—S—CH$_2$—CH—CH$_2$—O—C(O), 87.7 O—C(S)—S—CH$_2$—CH—CH$_2$—O—C(O), 119.9 O—C(S)—S—CH$_2$—CH—CH$_2$—O—C(O)—CH=CH, 152.1 O—C(S)—S—CH$_2$—CH—CH$_2$—O—C(O)—CH=CH, 166.2 O—C(S)—S—CH$_2$—CH—CH$_2$—O—C(O), 210.2 O—C(S)—S—CH$_2$—CH—CH$_2$—O—C(O).

These values confirm the structure:

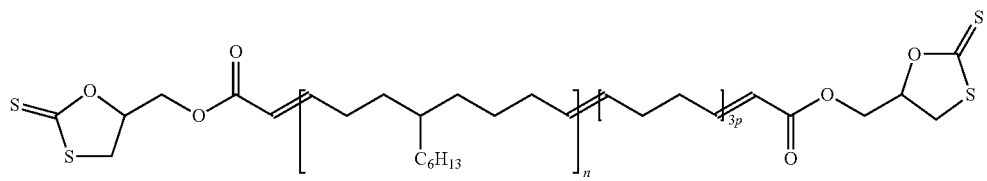

which is indeed covered by formula (II') defined previously.

The number-average molecular mass Mn and the polydispersity index are, respectively, 7500 g/mol and 1.80.

EXAMPLE 13: SYNTHESIS OF A POLYMER COMPRISING TWO (2-THIONE-1,3-OXATHIOLAN-4-YL)-METHYLENE-ETHER END GROUPS WITH A STEP OF POLYMERIZATION OF CDT AND 5-N-HEXYLCYCLOOCTENE, IN THE PRESENCE OF CTA'²

Example 12 is repeated, replacing the CTA² with CTA'².

At the end of step (ii), a liquid copolymer is obtained, NMR analysis of which gives the following values:
$^1$H NMR: δ (ppm) repeating unit 0.83 (3H*n), 1.27 (16H*n), 2.07 (4H*n), 2.17 (5H*n), 5.37 (2H*n), end group=3.60 O—C(S)—S—CH₂—CH—CH₂—O—, 4.04 O—C(S)—S—CH₂—CH—CH₂—O—CH₂, 4.49 O—C(S)—S—CH₂—CH—CH₂—O—, 5.39 O—C(S)—S—CH₂—CH—CH₂—O—.
$^{13}$C NMR: δ (ppm) repeating unit 14.1, 22.7, 27.4, 29.6, 31.8, 32.4, 33.1, 33.8, 40.6, 130.5, end group=41.5 O—C(S)—S—CH₂—CH—CH₂—O—, 69.1 O—C(S)—S—CH₂—CH—CH₂—O—CH₂, 73.9 O—C(S)—S—CH₂—CH—CH₂—O—, 88.3 O—C(S)—S—CH₂—CH—CH₂—O—, 210.2 O—C(S)—S—CH₂—CH—CH₂—O—.

These values confirm the structure:

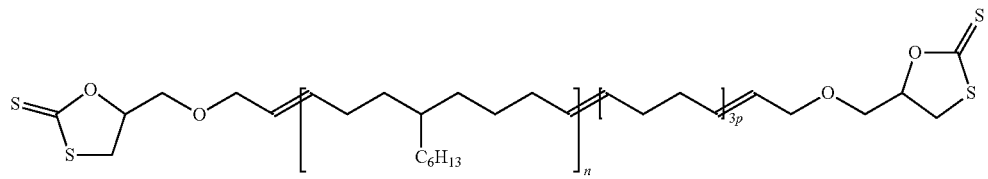

which is indeed covered by formula (II') defined previously.

The number-average molecular mass Mn and the polydispersity index are, respectively, 7600 g/mol and 1.80.

EXAMPLE 14: SYNTHESIS OF A POLYMER COMPRISING TWO (2-THIONE-1,3-OXATHIOLAN-4-YL)-METHYLENE-ESTER END GROUPS WITH A STEP OF POLYMERIZATION OF CDT AND CYCLOOCTENE AND NORBORNENE IN THE PRESENCE OF CTA²

Example 2 is repeated, the 10.8 mmol of COD being replaced with a mixture of 3.6 mmol of CDT, 3.6 mmol of cyclooctene and 3.6 mmol of norbornene.

The ratio of the reagents, expressed as number of moles: CTA²/(CDT+cyclooctene+norbornene), is 0.025.

A copolymer that is liquid at room temperature is also obtained, NMR analysis of which gives the following values:

$^1$H NMR: δ (ppm) repeating unit trans: 1.08 (2H*n), 1.26 (8H*n), 1.39 (4H*n), 2.00 (4H*n), 2.07 (4H*n), 2.47 (2H*n trans), 5.24-5.44 (6H*n trans), repeating unit cis: 1.26 (8H*n), 1.82-1.91 (6H*n), 2.00 (4H*n), 2.07 (4H*n), 2.82 (2H*n cis), 5.24-5.44 (6H*n cis), end group=3.60 O—C(S)—S—CH₂—CH—CH₂—O—C(O)—CH=CH, 4.49 O—C(S)—S—CH₂—CH—CH₂—O—C(O)—CH=CH, 5.39 O—C(S)—S—CH₂—CH—CH₂—O—C(O)—CH=CH, 5.85 O—C(S)—S—CH₂—CH—CH₂—O—C(O)—CH=CH, 7.08 O—C(S)—S—CH₂—CH—CH₂—O—C(O)—CH=CH.

$^{13}$C NMR: δ (ppm) repeating unit 27.4, 28.5, 32.5, 33.1, 42.1, 43.4, 130.3, 133.1, end group=36.1 O—C(S)—S—CH₂—CH—CH₂—O—C(O), 62.7 O—C(S)—S—CH₂—CH—CH₂—O—C(O), 87.7 O—C(S)—S—CH₂—CH—CH₂—O—C(O), 119.9 O—C(S)—S—CH₂—CH—CH₂—O—C(O)—CH=CH, 152.1 O—C(S)—S—CH₂—CH—CH₂—O—C(O)—CH=CH, 166.2 O—C(S)—S—CH₂—CH—CH₂—O—C(O), 210.2 O—C(S)—S—CH₂CH—CH₂—O—C(O).

These values confirm the structure:

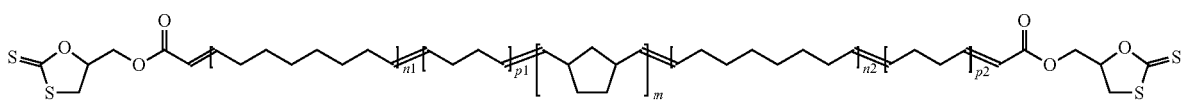

This structure is indeed covered by formula (I') defined previously.

The number-average molecular mass Mn and the polydispersity index are respectively 5800 g/mol and 1.90.

EXAMPLE 15: SYNTHESIS OF A POLYMER COMPRISING TWO (2-THIONE-1,3-OXATHIOLAN-4-YL)-METHYLENE-ETHER END GROUPS WITH A STEP OF POLYMERIZATION OF CDT, CYCLOOCTENE AND NORBORNENE, IN THE PRESENCE OF CTA'²

Example 14 is repeated, replacing the CTA² with CTA'².
At the end of step (ii), a liquid copolymer is obtained, NMR analysis of which gives the following values:

$^1$H NMR: δ (ppm) repeating unit trans: 1.08 (2H*n), 1.26 (8H*n), 1.39 (4H*n), 2.00 (4H*n), 2.07 (4H*n), 2.47 (2H*n trans), 5.24-5.44 (6H*n trans), repeating unit cis: 1.26 (8H*n), 1.82-1.91 (6H*n), 2.00 (4H*n), 2.07 (4H*n), 2.82 (2H*n cis), 5.24-5.44 (6H*n cis), end group=3.60 O—C(S)—S—CH$_2$—CH—CH$_2$—O—, 4.04 O—C(S)—S—CH$_2$—CH—CH$_2$—O—CH$_2$, 4.49 O—C(S)—S—CH$_2$—CH—CH$_2$—O—, 5.39 O—C(S)—S—CH$_2$—CH—CH$_2$—O—.

$^{13}$C NMR: δ (ppm) repeating unit 27.4, 28.5, 32.5, 33.1, 42.1, 43.4, 130.3, 133.1, end group=41.5 O—C(S)—S—CH$_2$—CH—CH$_2$—O—, 69.1 O—C(S)—S—CH$_2$—CH—CH$_2$—O—CH$_2$, 73.9 O—C(S)—S—CH$_2$—CH—CH$_2$—O—, 88.3 O—C(S)—S—CH$_2$—CH—CH$_2$—O—, 210.2 O—C(S)—S—CH$_2$—CH—CH$_2$—O—.

These values confirm the structure:

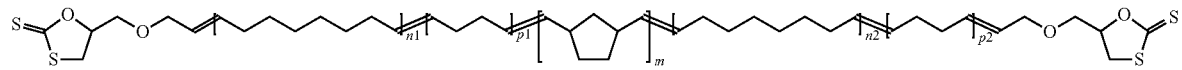

This structure is indeed covered by formula (I') defined previously.

The number-average molecular mass Mn and the polydispersity index are respectively 5800 g/mol and 1.80.

EXAMPLE 16: SYNTHESIS OF A POLY(THIO)URETHANE BY REACTING THE POLYMER OF EXAMPLE 2 WITH A DIAMINE AT 80° C.

A mixture of the polyolefin (2-thione-1,3-oxathiolan-4-yl)-methylene-ester of Example 2 (solid at room temperature) is reacted at 80° C., in a stoichiometric ratio, with a primary diamine of polyetherdiamine type (Jeffamine EDR 176, Huntsman), for a time corresponding to the total disappearance of the infrared band characteristic of the 2-thione-1,3-oxathiolan-4-yl groups (C=S band at 1200 cm$^{-1}$ in infrared) and to the appearance of the bands characteristic of the thiocarbamate bond (C=S band at 1530 cm$^{-1}$ in infrared) and of the thiol and disulfide functions (SH band at 2500 cm$^{-1}$ and S—S band at 510 cm$^{-1}$ in Raman).

This reaction time is less than 3 hours.

EXAMPLE 17: SYNTHESIS OF A POLY(THIO)URETHANE BY REACTING THE POLYMER OF EXAMPLE 4 WITH A DIAMINE AT 23° C.

Example 16 is repeated with the liquid polyolefin (2-thione-1,3-oxathiolan-4-yl)-methylene-ester of Example 6, the mixture being reacted at room temperature (23° C.).

The reaction time is less than 3 hours.

EXAMPLE 18: SYNTHESIS OF A POLY(THIO)URETHANE BY REACTING THE POLYMER OF EXAMPLE 3 WITH A DIAMINE AT 80° C.

Example 16 is repeated with the solid polyolefin (2-thione-1,3-oxathiolan-4-yl)-methylene-ether of Example 3.

The reaction time is less than 3 hours.

EXAMPLE 19: SYNTHESIS OF A POLY(THIO)URETHANE BY REACTING THE POLYMER OF EXAMPLE 7 WITH A DIAMINE AT 23° C.

Example 17 is repeated with the viscous liquid polyolefin (2-thione-1,3-oxathiolan-4-yl)-methylene-ether of Example 7.

The reaction time is less than 3 hours.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Hydrocarbon-based polymer comprising two dithiocyclocarbonate end groups, said hydrocarbon-based polymer having the formula (I):

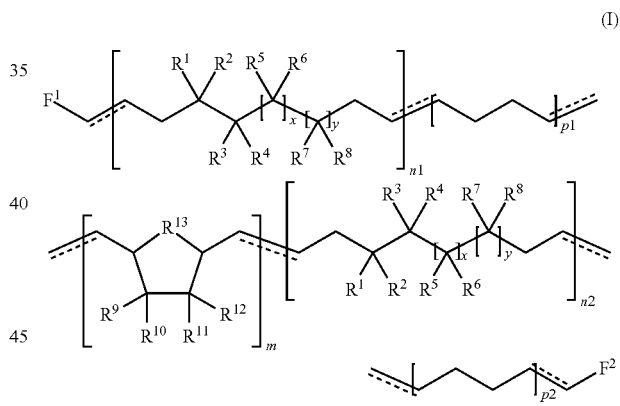

in which:

F$^1$ and F$^2$ are monovalent radicals of respective formulae (IIa) and (IIb):

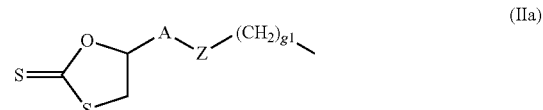

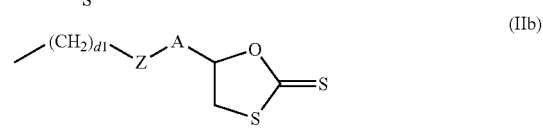

or alternatively F$^1$ and F$^2$ are monovalent radicals of respective formulae (II'a) and (II'b):

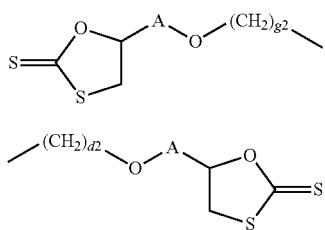

(II'b)

in which:
g1 and d1, which may be identical or different, represent an integer equal to 0, 1, 2 or 3;
g2 and d2, which may be identical or different, represent an integer equal to 1, 2 or 3;
A represents a divalent $C_1$-$C_9$ alkylene radical;
Z is such that:
the divalent group A-Z— is the group -A-C(=O)O— and the divalent group —Z-A- is the group —OC(=O)-A- with the proviso that g1 and d1 are each other than 0; or alternatively
the divalent group —A-Z— is the group -A-OC(=O)— and the divalent group —Z-A- is the group —C(=O)O-A-;
each carbon-carbon bond of the main chain of the polymer, denoted ======, represents a double bond or a single bond, in accordance with the valency rules of organic chemistry;
$R^1$, $R^2$, $R^3$, $R^4$, $R^5$, $R^6$, $R^7$ and $R^8$, which may be identical or different, represent:
a hydrogen or halogen atom; or
a radical comprising from 1 to 22 carbon atoms chosen from alkyl, alkenyl, alkoxycarbonyl, alkenyloxycarbonyl, alkylcarbonyloxy or alkenylcarbonyloxy, it being possible for the hydrocarbon-based chain of said radical to be optionally interrupted with at least one oxygen atom or one sulfur atom; in addition:
at least one of the $R^1$ to $R^8$ groups can form, with at least one other of the $R^1$ to $R^8$ groups and with the carbon atom or atoms to which said groups are linked, a 3- to 10-membered, optionally substituted, saturated or unsaturated hydrocarbon-based ring or heterocycle; and
at least one of the pairs ($R^1$, $R^2$), ($R^3$, $R^4$), ($R^5$, $R^6$) and ($R^7$, $R^8$) can form, with the carbon atom to which said pair is linked, a carbonyl group C=O or a group of two carbon atoms linked by a double bond: C=C, the other carbon atom of which bears two substituents chosen from a hydrogen atom and a $C_1$-$C_4$ alkyl radical;
x and y are integers, which may be identical or different, within a range extending from 0 to 4, the sum x+y being within a range extending from 0 to 4;
$R^9$, $R^{10}$, $R^{11}$ and $R^{12}$, which may be identical or different, represent:
a hydrogen or halogen atom; or
a radical comprising from 1 to 22 carbon atoms which is chosen from alkyl, alkenyl, alkoxycarbonyl, alkenyloxycarbonyl, alkylcarbonyloxy, alkenylcarbonyloxy and alkylcarbonyloxyalkyl, it being possible for the hydrocarbon-based chain of said radical to be optionally interrupted with at least one oxygen atom or one sulfur atom; in addition:

at least one of the $R^9$ to $R^{12}$ groups can form, with at least one other of the $R^9$ to $R^{12}$ groups and with the carbon atom or atoms to which said groups are linked, a 3- to 10-membered, optionally substituted, saturated or unsaturated hydrocarbon-based ring or heterocycle; and
at least one of the pairs ($R^9$, $R^{10}$) and ($R^{11}$, $R^{12}$) can form, with the carbon atom to which said pair is linked, a group of two carbon atoms linked by a double bond: C=C, the other carbon atom of which bears two substituents chosen from a hydrogen atom and a $C_1$-$C_4$ alkyl radical; and
the carbon atom bearing one of the groups of the pair ($R^9$, $R^{10}$) may be linked to the carbon atom bearing one of the groups of the pair ($R^{11}$, $R^{12}$) by a double bond, it being understood that, in accordance with the valency rules, only one of the groups of each of these two pairs is then present;
$R^{13}$ represents:
an oxygen or sulfur atom, or
a divalent radical —$CH_2$—, —C(=O)— or —$NR^0$— in which $R^0$ is an alkyl or alkenyl radical comprising from 1 to 22 carbon atoms;
n1 and n2, which may be identical or different, are each an integer or equal to 0, the sum of which is denoted by n;
m is an integer greater than or equal to 0;
p1 and p2, which may be identical or different, are each an integer or equal to 0, the sum p1+p2 of which is non-zero and adheres to the equation:

$$p1+p2=q\times(z+1)$$

in which:
q is an integer greater than 0; and
z is an integer ranging from 1 to 5; and
n1, n2, m, p1 and p2 also being such that the number-average molecular mass Mn of the polymer of formula (I) is within a range extending from 400 to 100 000 g/mol and its polydispersity index is within a range extending from 1.0 to 3.0.

2. Hydrocarbon-based polymer according to claim 1, characterized in that:
$R^1$, $R^2$, $R^3$, $R^4$, $R^5$, $R^6$, $R^7$ and $R^8$ represent a hydrogen atom or an alkyl radical comprising from 1 to 14 carbon atoms;
the integers x and y are within a range extending from 0 to 2, the sum x+y being within a range extending from 0 to 2;
x is equal to 1 and y is equal to 1;
$R^9$, $R^{10}$, $R^{11}$ and $R^{12}$ represent a hydrogen atom or a radical, the hydrocarbon-based part of which comprises from 1 to 14 carbon atoms;
z is an integer equal to 1 or 2; and/or
the number-average molecular mass Mn is within a range extending from 1000 to 50 000 g/mol.

3. Hydrocarbon-based polymer according to claim 1, characterized in that:
when m is non-zero and when n1 and n2 are each equal to 0, then the ratio: m/(p1+p2+m) is within the interval ranging from 30 to 70%; or
when m is equal to 0 and when the sum n1+n2 is non-zero, then at least one of the groups $R^1$, $R^2$, $R^3$, $R^4$, $R^5$, $R^6$, $R^7$ and $R^8$ is other than a hydrogen atom, and the ratio: (n1+n2)/(p1+p2+n1+n2) is within the interval ranging from 30 to 70%; or
when m is non-zero, when the sum n1+n2 is non-zero and when each of the groups $R^1$, $R^2$, $R^3$, $R^4$, $R^5$, $R^6$, $R^7$ and $R^8$ is a hydrogen atom, then the ratio: $m/(p1+p2+n1+n2+m)$ is within the interval ranging from 30 to 70%; or when m is non-zero, when the sum $n1+n2$ is non-zero and when at least one of the groups $R^1$, $R^2$, $R^3$, $R^4$, $R^5$, $R^6$, $R^7$ and $R^8$ is other than a hydrogen atom, then the ratio: $(m+n1+n2)/(p1+p2+n1+n2+m)$ is within the interval ranging from 30 to 70%.

4. Hydrocarbon-based polymer according to claim 1, characterized in that it has the formula (I') below:

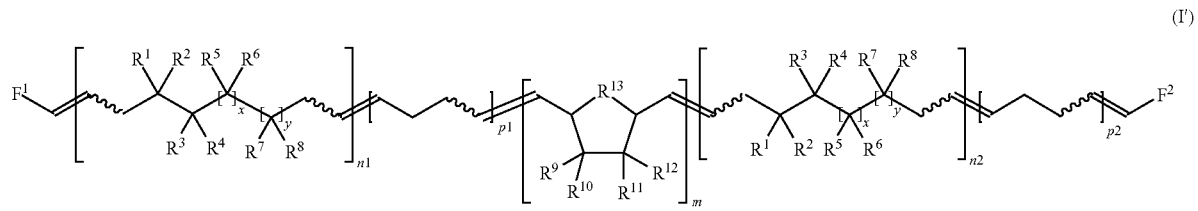

(I')

in which the ══ bond is a bond geometrically oriented on one side or the other relative to the double bond.

5. Hydrocarbon-based polymer according to claim 1, characterized in that m is equal to 0, the polymer being of formula (II) below:

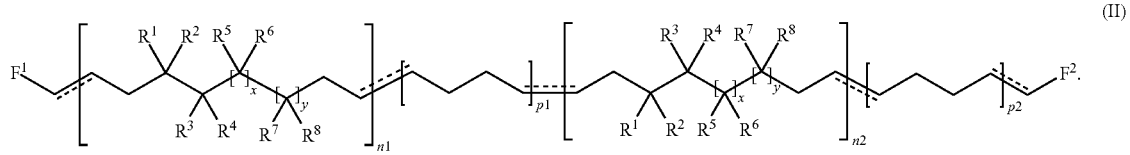

(II)

6. Hydrocarbon-based polymer according to claim 5, characterized in that it has the formula (II') below:

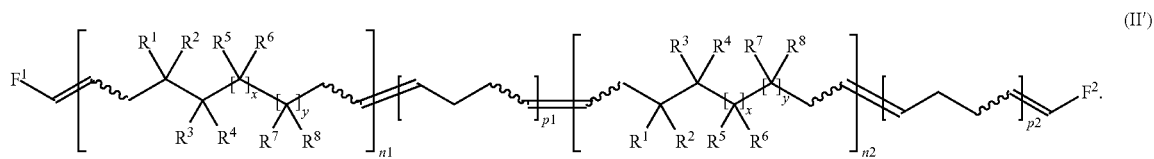

(II')

7. Hydrocarbon-based polymer according to claim 1, characterized in that n1 and n2 are each equal to 0, the polymer being of formula (III) below:

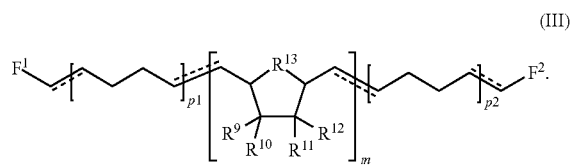

(III)

8. Hydrocarbon-based polymer according to claim 7, characterized in that it has the formula (III') below:

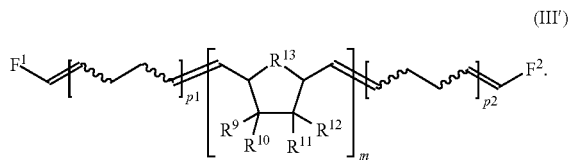

(III')

9. Hydrocarbon-based polymer according to claim 1, characterized in that n1, n2 and m are each equal to 0, the polymer being of formula (IV) below:

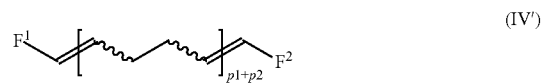

(IV)

10. Hydrocarbon-based polymer according to claim 9, characterized in that it has the formula (IV') below:

(IV')

11. Hydrocarbon-based polymer according to claim 1, characterized in that the radical A represents a methylene radical; and/or Z is such that the divalent group -A-Z— is the group -A-OC(=O)— and the divalent group —Z-A- is the group —C(=O)O-A-.

12. Hydrocarbon-based polymer according to claim 1, characterized in that g1=d1=0 or g2=d2=1.

13. Process for preparing a hydrocarbon-based polymer as defined in claim 1, said process comprising at least:

(i) one step of ring-opening metathesis polymerization in the presence of:
(a) a metathesis catalyst;
(b) a chain-transfer agent which is:
when $F^1$ and $F^2$ are the monovalent radicals having the respective formulae (IIa) and (IIb): a mono- or diepoxide compound having the respective formulae (E1) and (E2):

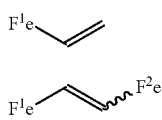

(E1)

(E2)

in which $F^1e$ and $F^2e$ are the monovalent radicals having the respective formulae (IIea) and (IIeb):

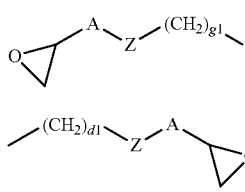

(IIea)

(IIeb)

and
when $F^1$ and $F^2$ are the monovalent radicals having the respective formulae (II'a) and (II'b): a diepoxide compound of formula (E'2):

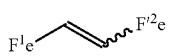

(E'2)

in which $F'^1e$ and $F'^2e$ are the monovalent radicals having the respective formulae (II'ea) and (II'eb):

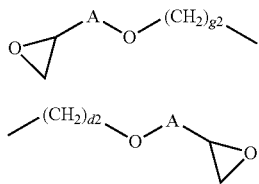

(II'ea)

(II'eb)

it being understood that, in the above formulae, the ═══ bond is a carbon-carbon single bond geometrically oriented on one side or the other relative to the double bond;

(c) a compound of formula (C):

(C)

(d) optionally a compound of formula (D):

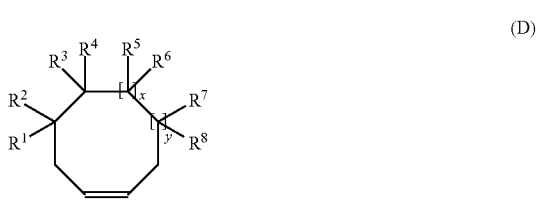

(D)

and (e) optionally a compound of formula (E):

(E)

said polymerization step leading to the formation of a polymer bearing epoxide end groups of formula (V):

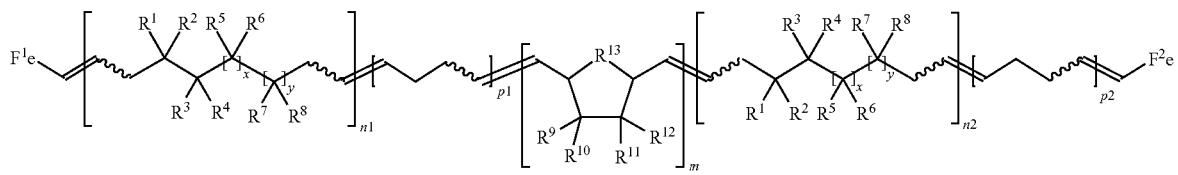

or (V'):

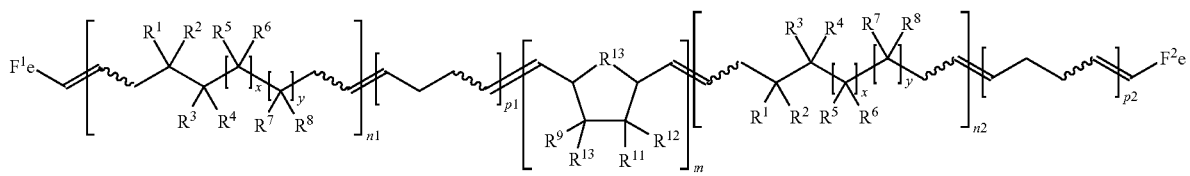

in which $F^1e$, $F^2e$, $F'^1e$ and $F'^2e$ are as defined previously, and, in the case where the CTA of formula (E1) is implemented: $F^1e=F^2e$;

said polymerization step also being performed:
- for a time ranging from 2 to 24 hours and at a temperature within an interval from 20 to 60° C.; and
- with a ratio r equal to the ratio of the number of moles of said CTA:
  - to the number of moles of the compound of formula (C), if the latter is the only reagent other than the CTA implemented in the reaction, or
  - to the sum of the number of moles of the compound of formula (C) and of the number of moles of the compounds of formulae (D) and/or (E), if the compounds of formulae (D) and/or (E) are also implemented in the reaction,
- within an interval ranging from 0.0010 to 1.0; and then (ii) a step of dithiocarbonation of the polymer of formula (V) or (V') obtained in the preceding step, by reaction with carbon disulfide ($CS_2$) in the presence of a halogenated lithium compound, at a temperature ranging from 10 to 45° C.

14. An adhesive comprising the hydrocarbon-based polymer as defined in claim 1, as a mixture with an amine compound comprising at least two amine groups.

15. Process for assembling two substrates by bonding, comprising:

coating at least one of the two substrates to be assembled with a liquid adhesive composition obtained by mixing an amine compound comprising at least two amine groups with the hydrocarbon-based polymer as defined in claim 1; then actually bringing the two substrates into contact.

* * * * *